(12) United States Patent
Yamauchi

(10) Patent No.: US 6,791,128 B1
(45) Date of Patent: Sep. 14, 2004

(54) SEMICONDUCTOR INTEGRATED CIRCUIT DEVICE AND METHOD FOR DESIGNING THE SAME

(75) Inventor: Hiroyuki Yamauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 10/252,563

(22) Filed: Sep. 24, 2002

(30) Foreign Application Priority Data

Oct. 26, 2001 (JP) ........................................ 2001-329582

(51) Int. Cl.⁷ ........................... H01L 27/11; G11C 11/00
(52) U.S. Cl. .................. 257/206; 365/154; 257/27.098
(58) Field of Search ........................ 257/201–211, 401, 257/E21.445, E23.07, E23.151, E23.175, E27.098, E27.099, 903, E21.661, E27.013, E27.026, E29.026, E27.027; 365/154, 63

(56) References Cited

U.S. PATENT DOCUMENTS

| | | | | |
|---|---|---|---|---|
| 5,264,385 A | * | 11/1993 | Rodder | 438/238 |
| 5,378,906 A | * | 1/1995 | Lee | 287/296 |
| 5,932,900 A | | 8/1999 | Lin et al. | |
| 6,054,742 A | * | 4/2000 | Gonzalez | 257/392 |
| 6,091,629 A | * | 7/2000 | Osada et al. | 365/156 |
| 6,232,619 B1 | | 5/2001 | Chen et al. | |
| 6,381,166 B1 | * | 4/2002 | Yoshida et al. | 365/63 |
| 6,469,328 B2 | * | 10/2002 | Yanai et al. | 257/207 |

OTHER PUBLICATIONS

Gold, S.M., Bernhardt, B., and Brown, R.B., "A Quantitative Approach to Nonlinear Process Design Rule Scaling", in Advanced Research in VLSI, 1999. Proceedings, 20th Anniversary Conference on —; Mar. 21, 1999–Mar. 24, 1999, Atlanta, GA (USA) (INSPEC 6376058).*

* cited by examiner

Primary Examiner—Minhloan Tran
Assistant Examiner—Johannes Mondt
(74) Attorney, Agent, or Firm—McDermott Will & Emery LLP

(57) ABSTRACT

A semiconductor integrated circuit device has a plurality of design patterns composed of circuit elements or wires formed on a substrate. The respective finished sizes of the plurality of design patterns have a plurality of minimum size values which differ from one design pattern to another depending on the geometric feature of each of the design patterns.

4 Claims, 22 Drawing Sheets

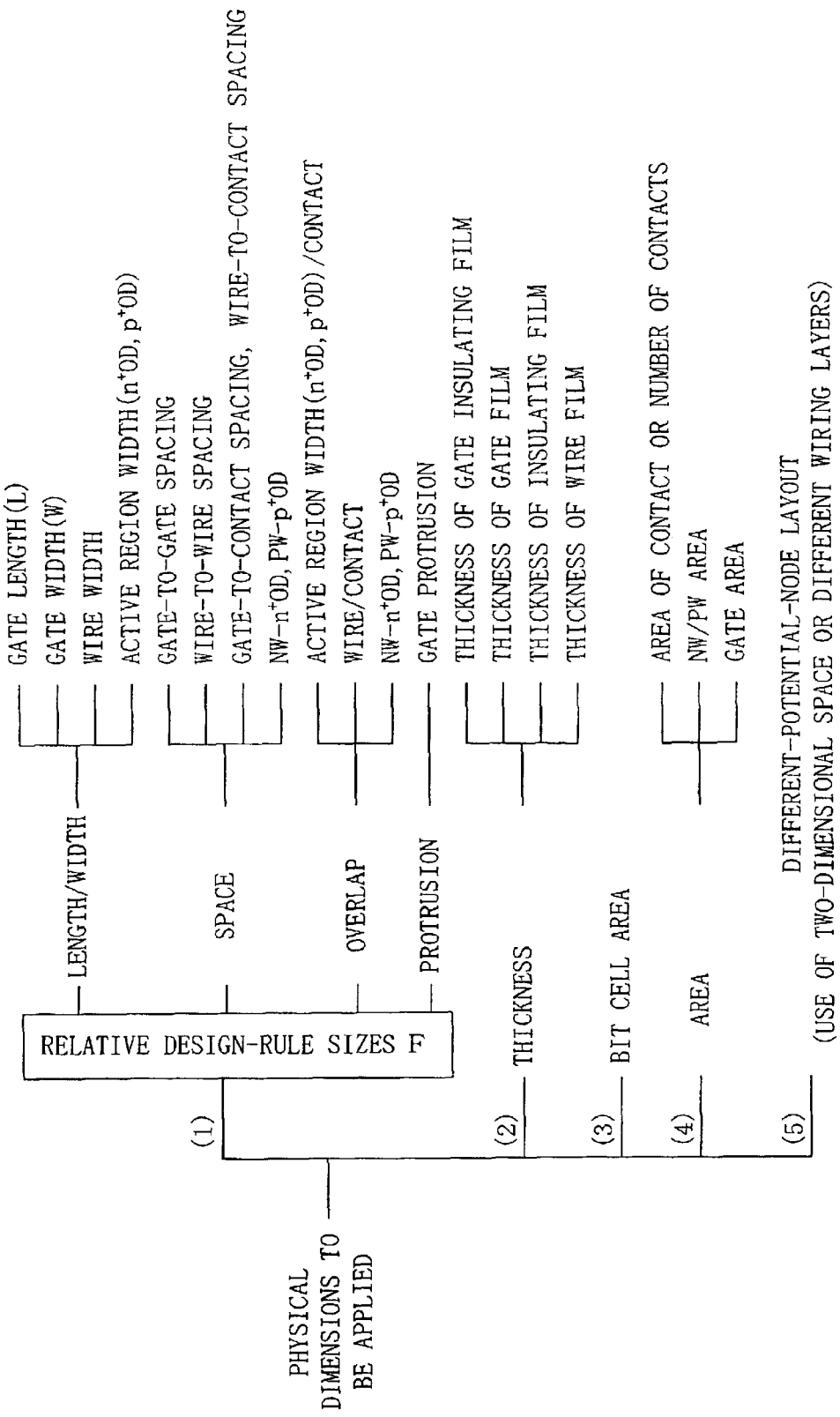

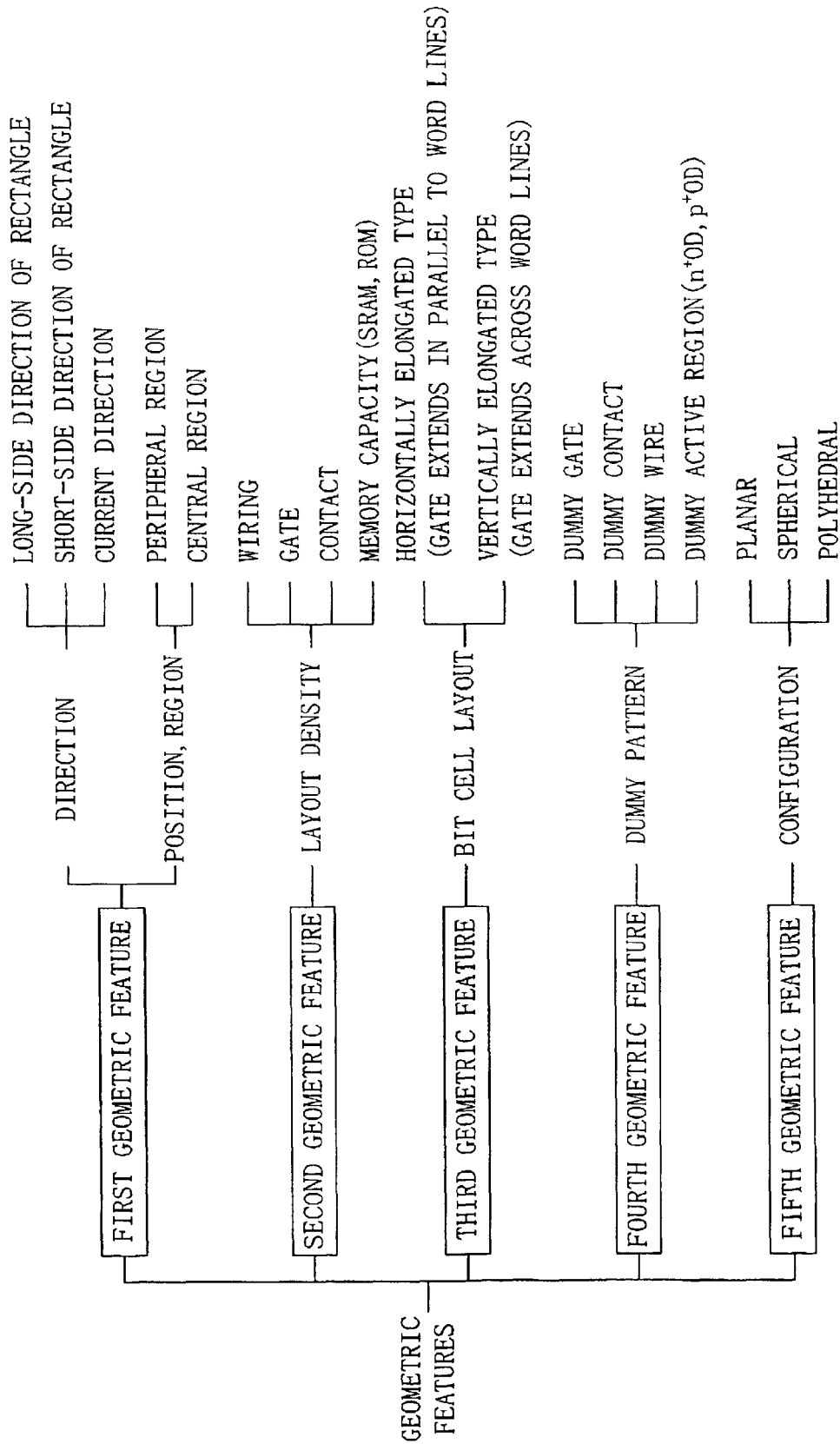

| PHYSICAL DIMENSIONS TO BE APPLIED | CONDITION TO BE APPLIED (FIRST GEOMETRIC FEATURE) |
|---|---|
| BIT CELL AREA($\mu m^2$) (S_bitcell) | DIRECTION (GATE EXTENDS IN UNIFORM DIRECTION) |
| BIT-CELL AREA IN SRAM S_bitcell=2.4 S_bitcell=3.5 | MAIN GATES COMPOSING SRAM EXTENDS IN UNIFORM DIRECTION IN WHICH LITHOGRAPHY IS OPTIMIZED |

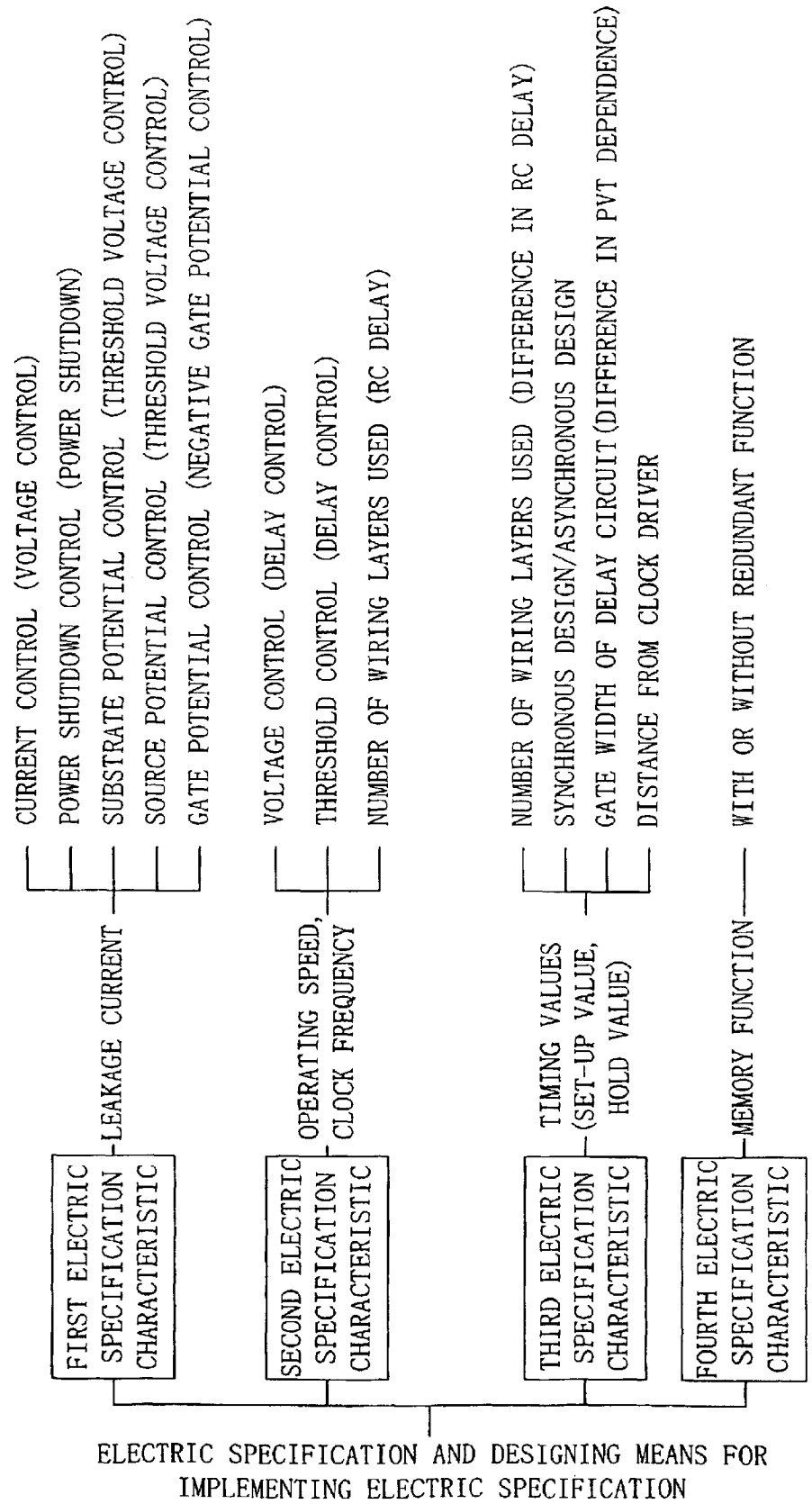

GATE LENGTH Lg=LONG

| PHYSICAL DIMENSIONS TO BE APPLIED | CONDITION TO BE APPLIED (FOURTH ELECTRIC SPECIFICATION) |
|---|---|
| BIT CELL AREA ($\mu m^2$) (S_bitcell) | MEMORY FUNCTION (WITH OR WITHOUT REDUNDANT FUNCTION) |
| BIT-CELL AREA IN SRAM S_bitcell=2.4 S_bitcell=3.5 | WHETHER OR NOT UNIT SRAM BLOCK HAS REDUNDANCY-RELIEF FUNCTION |

WITH REDUNDANT FUNCTION

WITHOUT REDUNDANT FUNCTION

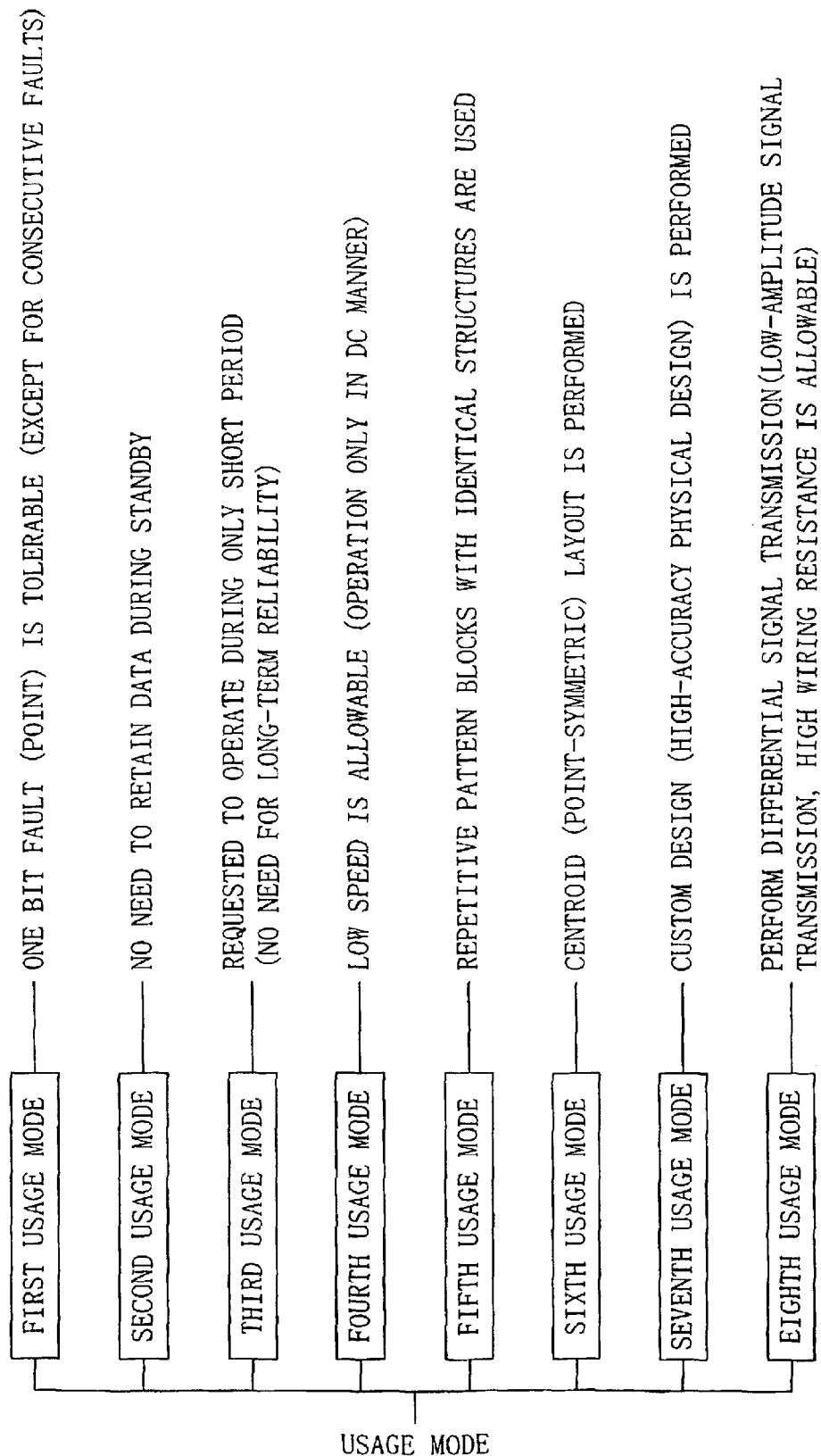

| PHYSICAL DIMENSIONS TO BE APPLIED | CONDITION TO BE APPLIED (FIRST USAGE MODE) |
|---|---|
| BIT CELL AREA ($\mu m^2$) (S_bitcell) | ONE BIT FAULT (POINT) IS TOLERABLE (EXCEPT FOR CONSECUTIVE FAULTS) |
| BIT-CELL AREA IN SRAM S_bitcell=2.4 | ONE BIT FAULT (POINT) IS TOLERABLE (EXCEPT FOR CONSECUTIVE FAULTS) GIVE HIGHER PRIORITY TO CAPACITY THAN TO POINT DEFECT |

SEMICONDUCTOR INTEGRATED CIRCUIT DEVICE AND METHOD FOR DESIGNING THE SAME

BACKGROUND OF THE INVENTION

The present invention relates to a semiconductor integrated circuit device which matches the trend toward further miniaturization and to a method for designing the same.

If a plurality of functional blocks are formed in one chip, it has not been performed conventionally to provide MOS transistors contained in a plurality of digital functional circuit blocks with different gate lengths or provide the respective gate oxide films of the MOS transistors with different thicknesses.

Briefly, in a conventional circuit designing method, on-chip micro-patterning is regulated by one design rule and a reduction in margin resulting from patterning variations is compensated for by using a uniform value. The reason for a uniform margin allowed is that a difference of one order of magnitude or more exists between a required performance value and a required margin. In an exemplary case, a specification for a required access time is 3.0 ns, a mean value of actually obtained access times is 2.5 ns, and a required margin considering patterning variations is 0.3 ns. In the case where the specification for the required access time is set to 0.4 ns, however, if the mean value of actually obtained access times is improved to 0.25 ns and a margin of 0.30 ns is allowed, the improvement in performance is suppressed by the margin for patterning variations.

This indicates that, as increasingly higher performance is required in future, if a uniform margin for patterning variations is provided throughout the entire chip, an improvement in performance is suppressed by the uniform margin.

In other words, it becomes difficult to satisfy required performance throughout the entire chip, though the required performance is satisfied locally in a portion of the chip. As a result, the performance of the chip is limited by the worst portion of the entire chip so that the performance is not improved.

In an analog circuit or a circuit for which consideration should be given to a latch-up caused by an electrostatic damage (ESD) or to a breakdown voltage, it has been a conventional practice to use different design rules for a transistor provided on the I/O pad portion of the circuit and for the logic portion of the circuit. This is because different power supply voltages are applied thereto.

Thus, it has not been performed conventionally to use different design rules in one digital circuit block or in one analog circuit. It has not been performed, either, to divide one wafer into chips of different sizes or fabricate, from one wafer, various chips designed to have different functions or performances on a per chip basis.

As design sizes are reduced increasingly year after year, the design of a chip performed by applying one design rule to one chip encounters the following problems.

The design rule which is 0.13 $\mu$m in the year 2001 is expected to become 0.10 $\mu$m in the year 2005. If design is to be performed in accordance with the design rule of 0.10 $\mu$m, a fabrication process requires a patterning accuracy on the order of several tens of nanometers.

In that case, it will become extremely difficult to control variations in patterning accuracy to several tens of nanometers in consideration of each of variations in patterning accuracy in the fabrication process depending on the regions of the principal surface (portion) of a wafer, the relationship between the regions (portions) of one chip and layout densities therein, and the like.

If design rules also considering variations in patterning accuracy are applied, a design margin is reduced dramatically so that the yield rate is reduced significantly. As a consequence, the trend toward further miniaturization drastically increases the manufacturing cost for a chip.

SUMMARY OF THE INVENTION

In view of the foregoing problems expected, an object of the present invention is to positively match the trend toward a further reduction in design size.

As a result of examining a performance required of each of a plurality of functional blocks integrated in one chip, the present inventor has concluded that an operating speed, a leakage current, and the like need not necessarily be the same for each of the functional blocks. In a system LSI using a design rule of 0.10 $\mu$m or less which implements ultra-miniaturization technology, in particular, all devices required for the system LSI are integrated with each other so that the trend toward the use of a different operating speed, a different leakage current, and the like for each of functional blocks will probably grow.

To attain the object, the present invention provides a semiconductor integrated circuit device which is constructed such that:

(1) if different finished sizes resulting from geometric features are predictable for design patterns containing elements and wires formed on one chip, (2) if finished sizes are different depending on electric specifications required of the design patterns and on designing means (methods) for implementing the electric specifications, or (3) if required specifications are different depending on usage modes in the design patterns, performance variations resulting from patterning variations and variations in required performance are complemented by each other. It follows therefore that circuit elements or wires in a semiconductor integrated circuit device formed on one substrate have a plurality of minimum sizes values.

Specifically, a first semiconductor integrated circuit device according to the present invention comprises: a plurality of design patterns composed of circuit elements or wires formed on a substrate, respective finished sizes of the plurality of design patterns having a plurality of minimum size values which differ from one design pattern to another depending on a geometric feature of each of the design patterns.

In the first semiconductor integrated circuit device, design margins for the plurality of design patterns are not uniform so that an improvement in the performance of the device is not suppressed by a margin for patterning variations.

Preferably, in the first semiconductor integrated circuit device, the plurality of minimum size values are set for a length or width of each of parts composing the circuit elements, a spacing between the parts, an overlapping portion between the parts, or a configuration of a protruding portion of the part and are set for a width of each of the wires or a spacing between the wires.

Preferably, in the first semiconductor integrated circuit device, the circuit elements are bit cells in a memory device and an area occupied by each of the bit cells is determined by any of the plurality of minimum size values.

Preferably, in the first semiconductor integrated circuit device, the circuit elements are contained in an element formation layer and the wires are contained in a wiring layer, the device further comprising: one or more contacts for providing an electric connection between the element formation layer and the wiring layer, the minimum size value of the finished size of each of the contacts depending on an area occupied by the contact on the substrate or on the number of the contacts.

Preferably, in the first semiconductor integrated circuit device, the geometric feature is respective directions or positions of the circuit elements or the wires on the substrate and the plurality of minimum size values are set to correct dependence of the finished sizes on the directions or positions on the substrate.

Preferably, in the first semiconductor integrated circuit device, the geometric feature is a layout density of the circuit elements or the wires on the substrate and the plurality of minimum size values are set to correct dependence of the finished sizes on the layout density.

Preferably, in the first semiconductor integrated circuit device, the circuit elements are bit cells in a memory device, the geometric feature is a layout type of the bit cells, and the plurality of minimum size values are set to correct dependence of the finished size on a relationship between a direction in which a gate of a drive transistor extends and a direction in which a gate of an access transistor connected to a word line extends in each of the bit cells.

Preferably, in the first semiconductor integrated circuit device, the geometric feature is the presence or absence of a dummy pattern which is a dummy of each of the design patterns contained therein and, if the dummy patterns are contained in the design pattern, the plurality of minimum size values are set to correct dependence of the finished size on the dummy pattern.

A second semiconductor integrated circuit device according to the present invention comprises: a plurality of design patterns composed of circuit elements or wires formed on a substrate, the plurality of design patterns having a plurality of minimum size values which differ from one design pattern to another depending on different finished sizes resulting from an electric specification of each of the design patterns and a designing means for implementing the electric specification.

In the second semiconductor integrated circuit device, design margins for the plurality of design patterns are not uniform so that an improvement in the performance of the device is not suppressed by a margin for patterning variations.

Preferably, in the second semiconductor integrated circuit device, the plurality of minimum size values are set for a length or width of each of parts composing the circuit elements, a spacing between the parts, an overlapping portion between the parts, or a configuration of a protruding portion of the part and are set for a width of each of the wires or a spacing between the wires.

Preferably, in the second semiconductor integrated circuit device, the circuit elements are bit cells in a memory device and an area occupied by each of the bit cells is determined by any of the plurality of minimum size values.

Preferably, in the second semiconductor integrated circuit device, the circuit elements are contained in an element formation layer and the wires are contained in a wiring layer, the device further comprising: one or more contacts for providing an electric connection between the element formation layer and the wiring layer, the minimum size value of the finished size of each of the contacts depending on an area occupied by the contact on the substrate or on the number of the contacts.

A third semiconductor integrated circuit device according to the present invention comprises: a design pattern composed of a plurality of circuit elements or the wires formed on a substrate, the design pattern having a plurality of minimum size values in a spacing between parts at different potentials during standby which differ depending on an electric specification and a designing means for implementing the electric specification.

In the third semiconductor integrated circuit device, design margins for the plurality of design patterns are not uniform so that an improvement in the performance of the device is not suppressed by a margin for patterning variations.

Preferably, in the third semiconductor integrated circuit device, the parts at different potentials during standby are formed in different layers.

Preferably, in the second or third semiconductor integrated circuit device, the electric specification is suppression of a leakage current and the designing means includes at least one of power voltage control, power shutdown control, threshold voltage control, and gate-to-source potential control.

Preferably, in the second or third semiconductor integrated circuit device, the electric specification is an operating speed and the designing means includes at least one of power voltage control, threshold voltage control, and delay control effected by using variations in the number of wiring layers used in a layout.

Preferably, in the second or third semiconductor integrated circuit device, the electric specification is a timing value and the designing means includes at least one of selection of synchronous design or asynchronous design, delay control effected by using variations in the number of wiring layers used in a layout, a delay circuit for timing adjustment, a gate size of a transistor, and a layout for adjusting a distance from a clock driver.

Preferably, in the second or third semiconductor integrated circuit device, the circuit elements are memory elements and the designing means is a means for imparting a redundancy function for saving a defect.

A fourth semiconductor integrated circuit device according to the present invention comprises: a plurality of design patterns composed of circuit elements or wires formed on a substrate, the plurality of design patterns having a plurality of minimum size values which differ from one design pattern to another depending on different required specifications dependent on usage modes thereof.

In the fourth semiconductor integrated circuit device, design margins for the plurality of design patterns are not uniform so that an improvement in the performance of the device is not suppressed by a margin for patterning variations.

Preferably, in the fourth semiconductor integrated circuit device, the circuit elements are composed of a plurality of memory elements and the usage modes and the required specifications are set to tolerate a fault in some of the plurality of memory elements.

Preferably, in the fourth semiconductor integrated circuit device, the circuit elements are memory elements and the usage modes and the required specifications are such that the memory elements do not retain data during standby.

A first method for designing a semiconductor integrated circuit device according to the present invention comprises the step of: forming, on a substrate, a plurality of design patterns composed of circuit elements or wires, wherein a plurality of design rules having different values are applied to the plurality of design patterns by using dependence of respective finished sizes of the design patterns on a geometric feature of each of the design patterns.

In accordance with the first method for designing a semiconductor integrated circuit device, design margins for the plurality of design patterns are not uniform so that an improvement in the performance of the device is not suppressed by a margin for patterning variations.

Preferably, in the first method for designing a semiconductor integrated circuit device, the plurality of design rules are applied to a length or width of each of parts composing the circuit elements, a spacing between the parts, an overlapping portion between the parts, or a configuration of a protruding portion of the part and are applied to a width of each of the wires or a spacing between the wires.

Preferably, in the first method for designing a semiconductor integrated circuit device, the circuit elements are bit cells in a memory device and an area occupied by each of the bit cells is determined by any of the plurality of design rules.

Preferably, the first method for designing a semiconductor integrated circuit device further comprises the step of: forming one or more contacts for providing electric connections between the circuit elements and the wires, wherein any of the plurality of design rules is applied by using dependence of the finished size of each of the contacts on an area occupied by the contact on the substrate or on the number of the contacts.

Preferably, in the first method for designing a semiconductor integrated circuit device, the geometric feature is directions or positions of the circuit elements or the wires on the substrate and the plurality of design rules are set to correct dependence of the finished sizes on the directions or positions on the substrate.

Preferably, in the first method for designing a semiconductor integrated circuit device, the geometric feature is a layout density of the circuit elements or the wires on the substrate and the design rules are set to correct dependence of the finished sizes on the layout density.

Preferably, in the first method for designing a semiconductor integrated circuit device, the circuit elements are bit cells in a memory device, the geometric features is a layout type of the bit cells, and the plurality of design rules are set to correct dependence of the finished size on a relationship between a direction in which a gate of a drive transistor extends and a direction in which a gate of an access transistor connected to a word line extends in each of the bit cells.

Preferably, in the first method for designing a semiconductor integrated circuit device, the geometric feature is the presence or absence of a dummy pattern which is a dummy of each of the design patterns contained therein and, if the dummy patterns are contained in the design pattern, the design rules are set to correct dependence of the finished size on the dummy pattern.

A second method for designing a semiconductor integrated circuit device according to the present invention comprises the step of: forming, on a substrate, a plurality of design patterns composed of circuit elements or wires, wherein a plurality of design rules having different values are applied to the plurality of design patterns depending on different finished sizes resulting from an electric specification of each of the design patterns and a designing method for implementing the electric specification.

In accordance with the second method for designing a semiconductor integrated circuit device, design margins for the plurality of design patterns are not uniform so that an improvement in the performance of the device is not suppressed by a margin for patterning variations.

Preferably, in the second method for designing a semiconductor integrated circuit device, the plurality of design rules are applied to a length or width of each of parts composing the circuit elements, a spacing between the parts, an overlapping portion between the parts, or a configuration of a protruding portion of the part and are applied to a width of each of the wires or a spacing between the wires.

Preferably, in the second method for designing a semiconductor integrated circuit device, the circuit elements are bit cells in a memory device and an area occupied by each of the bit cells is determined by any of the plurality of design rules.

Preferably, the second method for designing a semiconductor integrated circuit device further comprises the step of: forming one or more contacts for providing electric connections between the circuit elements and the wires, wherein any of the plurality of design rules is applied by using dependence of the finished size of each of the contacts on an area occupied by the contact on the substrate or on the number of the contacts.

A third method for designing a semiconductor integrated circuit device according to the present invention comprises the step of: forming, on a substrate, a plurality of design patterns composed of circuit elements or wires, wherein the plurality of design patterns include a spacing between parts at different potentials during standby and a plurality of design rules are applied to the plurality of design patterns depending on an electric specification of each of the design patterns and a designing method for implementing the electric specification.

In accordance with the third method for designing a semiconductor integrated circuit device, design margins for the plurality of design patterns are not uniform so that an improvement in the performance of the device is not suppressed by a margin for patterning variations.

Preferably, in the third method for designing a semiconductor integrated circuit device, the parts at different potentials during standby are formed in different layers.

Preferably, in the second or third method for designing a semiconductor integrated circuit device, the electric specification is suppression of a leakage current and the designing method includes at least one of power voltage control, power shutdown control, threshold voltage control, and gate-to-source potential control.

Preferably, in the second or third method for designing a semiconductor integrated circuit device, the electric specification is an operating speed and the designing method includes at least one of power voltage control, threshold voltage control, and delay control effected by using variations in the number of wiring layers used in a layout.

Preferably, in the second or third method for designing a semiconductor integrated circuit device, the electric specification is a timing value and the designing method includes at least one of selection of synchronous design or asynchronous design, delay control effected by using variations in the number of wiring layers used in a layout, a delay circuit for timing adjustment, a gate size of a transistor, and a layout for adjusting a distance from a clock driver.

Preferably, in the second or third method for designing a semiconductor integrated circuit device, the circuit elements are memory elements and the designing method is a method for imparting a redundancy function for saving a defect.

A fourth method for designing a semiconductor integrated circuit device according to the present invention comprises the step of: forming, on a substrate, a plurality of design patterns composed of circuit elements or wires, wherein a plurality of design rules having different values are applied to the plurality of design patterns depending on different required specifications dependent on respective usage modes of the design patterns.

In accordance with the fourth method for designing a semiconductor integrated circuit device, design margins for the plurality of design patterns are not uniform so that an improvement in the performance of the device is not suppressed by a margin for patterning variations.

Preferably, in the fourth method for designing a semiconductor integrated circuit device, the circuit elements are composed of a plurality of memory elements and the usage modes and the required specifications are set to tolerate a fault in some of the plurality of memory elements.

Preferably, in the fourth method for designing a semiconductor integrated circuit device, the circuit elements are memory elements and the usage modes and the required specifications are set such that the memory elements do not retain data during standby.

BRIEF DESCRIPTION OF THE DRAWINGS

FIG. 1 shows a category system of physical dimensions (physical dimensions to be applied) to be applied to design patterns composing a semiconductor integrated circuit device according to the present invention;

FIG. 2 shows a category system of geometric features in the design patterns composing the semiconductor integrated circuit device according to the present invention;

FIG. 10 shows a category system of electric specifications in the design patterns composing the semiconductor integrated circuit device according to the present invention and designing means for implementing the electric specifications;

FIGS. 11A and 11B show an SRAM block formed in a semiconductor integrated circuit device according to a seventh embodiment of the present invention, of which FIG. 11A is a partial circuit diagram showing an SRAM block in which current voltage control is performed and FIG. 11B is a plan view showing bit cells contained in the SRAM block;

FIGS. 12A and 12B show another SRAM block formed in the semiconductor integrated circuit device according to the seventh embodiment, of which FIG. 12A is a partial circuit diagram showing the SRAM block in which current voltage control is not performed and FIG. 11B is a plan view showing bit cells contained in the SRAM block;

FIGS. 13A to 13C show an SRAM block formed in a semiconductor integrated circuit device according to an eighth embodiment of the present invention, of which FIG. 13A is a partial circuit diagram showing the SRAM block in which power shutdown control is performed and FIGS. 13B and 13C are cross-sectional views showing bit lines and ground lines in the SRAM block;

FIGS. 14A and 14B show an SRAM block formed in a semiconductor integrated circuit device according to a ninth embodiment of the present invention, of which FIG. 14A is a partial circuit diagram showing the SRAM block in which power shutdown control is not controlled and FIG. 14B is a cross-sectional view showing bit lines and ground lines in the SRAM blocks;

FIGS. 16A and 16B show the respective structures of SRAM blocks according to the twelfth embodiment, of which FIG. 16A is a block diagram of the SRAM circuit having a redundancy function and FIG. 16B is a block diagram of the SRAM circuit not having a redundancy function;

FIG. 19 shows a category system of usage modes in the design patterns composing the semiconductor integrated circuit device according to the present invention;

FIGS. 21A and 21B show an SRAM block formed in a semiconductor integrated circuit device according to a fourteenth embodiment of the present invention, of which FIG. 21A is a partial circuit diagram showing the SRAM block in which power shutdown control is performed and FIG. 21B is a cross-sectional view showing bit lines and ground lines in the SRAM block; and FIGS. 22A and 22B show an SRAM block formed in a semiconductor integrated circuit device according to the fourteenth embodiment, of which FIG. 22A is a partial circuit diagram showing the SRAM block in which power shutdown control is not performed and FIG. 22B is a cross-sectional view showing bit lines and ground lines in the SRAM block.

DETAILED DESCRIPTION OF THE INVENTION

Figures 3A, 3B:
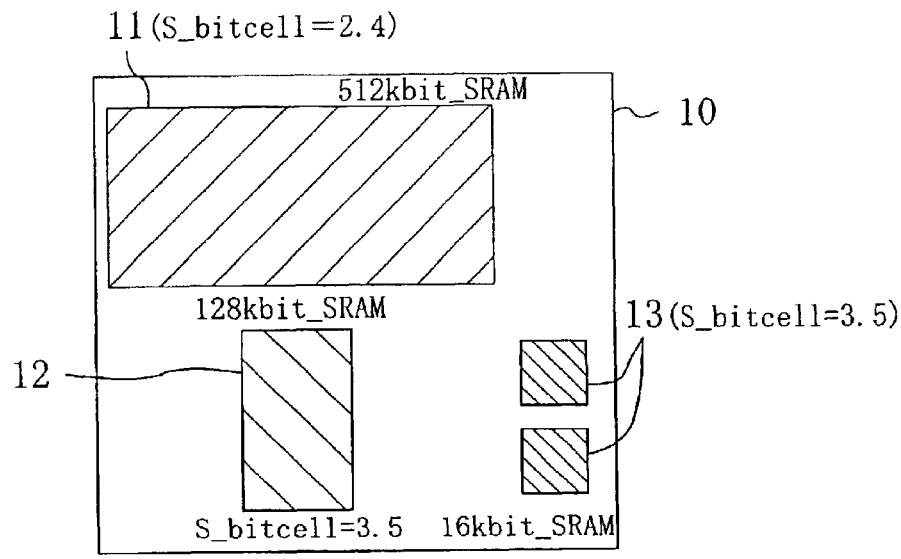
FIG. 3A is a plan view diagrammatically showing a chip-like semiconductor integrated circuit device according to a first embodiment of the present invention and SRAM blocks formed on the chip.
FIG. 3B is a table of physical dimensions and conditions to be applied to the SRAM blocks of FIG. 3A.

A description will be given first to "the case where different finished sizes resulting from geometric features are predictable", which is a first concept of the present invention.

A semiconductor integrated circuit device based on the first concept of the present invention comprises design patterns composed of a plurality of circuit elements or wires formed on a semiconductor substrate. The respective finished sizes of the design patterns have a plurality of minimum size values which differ from one design pattern to another depending on the geometric feature of each of the design patterns.

In other words, if the plurality of circuit elements composing the semiconductor integrated circuit device are assumedly contained in one element formation layer and the plurality of wires are contained in one wiring layer, a plurality of design rules having different values on a per layer basis are applied to the respective design patterns in the element formation layer and in the wiring layer depending on the different finished sizes resulting from the geometric features on the substrate.

A description will be given herein below to the categories of the design rules according to the present invention.

As shown in FIG. 1, the design rules for determining physical dimensions (physical dimensions to be applied) to be applied to the design patterns are grouped into, e.g., the following five categories.

The first category is relative design-rule sizes in a layout design process. The relative design-rule sizes are a set of design patterns directly proportional to the square of an F value representing an inverse number of an aperture ratio. For example, the relative rule-sizes of the circuit elements include the lengths and widths of the parts of the circuit elements, the space (spacing) between the parts, an overlap (overlapping portion) between the parts, and the configurations of the protruding portions of the parts. The relative design-rule sizes of the wires are the widths of the wires or the space between the wires.

If the circuit elements are assumed to be field-effect transistors (FETs), the lengths or widths of the parts can be subdivided into gate lengths, gate widths, and the widths of active regions (n$^+$OD, p$^+$OD). The width of an active region (OD: Oxide Definition) in a FET indicates a width in the gate width direction in source/drain regions.

The space between the parts can be subdivided into a gate-to-gate spacing, a gate-to-contact spacing, a wire-to-contact spacing, a spacing between an n-type well (NW) and an n-type active region, and a spacing between a p-type well (PW) and a p-type active region.

The protrusions include, e.g., the size of a protruding portion from the gate.

The design-rule values used herein are not necessarily the sizes of a mask and indicate actual finished sizes (expected values) after process patterning.

The second category is the thicknesses of the parts in the design patterns, which are, e.g., the respective thicknesses of gate insulating films, gates, insulating films, and wire films in FETs.

The third category is, if the design pattern is for, e.g., cells (bit cells) each composing one bit in a memory (storage) circuit, an area allowed for each of the bit cells in laying out the bit cells in the layout design process, i.e., a bit cell area.

The fourth category is areas occupied by the design patterns on the substrate. If contacts providing electric connections between the circuit elements contained in the element formation layer and the wires contained in the wiring layer are taken as an example, the fourth category is the layout area of the contacts or the number of the contacts occupying the layout area. Otherwise, the fourth category is areas occupied by n-type wells and p-type wells or areas occupied by the gates of FETs.

The fifth category is a layout of nodes at different potentials (different-potential nodes), which is the determination of whether the different-potential nodes are laid out in one layer or in different layers.

The physical dimensions used herein include sizes to be applied intentionally or inevitably.

A description will be given next to conditions for determining whether or not these design rules are to be applied to the design patterns.

FIG. 2 shows the geometric features of the design patterns which are divided into five groups. As shown in FIG. 2, the first geometric feature is the directions or positions (regions) of the design patterns on the substrate. The plurality of minimum size values of the design patterns according to the first embodiment are set to correct the dependence of the finished sizes on the directions or positions (regions) of the design patterns on the substrate.

Embodiment 1

A first embodiment of the present invention will be described herein below with reference to the drawings.

FIG. 3A diagrammatically shows a plan structure of a chip-like semiconductor integrated circuit device according to the first embodiment and static random access memory (SRAM) blocks formed on the chip.

As shown in FIG. 3A, a first SRAM block 11 having a capacity of 512 kbits, a second SRAM block 12 having a capacity of 128 kbits, and a third SRAM block having a capacity of 16 kbits are formed integrally on a principal surface of a chip 10 composed of, e.g., silicon.

Here, an area (S_bitcell) occupied by a cell corresponding to one bit (bit cell) which composes the first SRAM block 11 is assumed to be 2.4 $\mu m^2$ and an area occupied by a cell corresponding to one bit (bit cell) which composes the second and third SRAM blocks 12 and 13 is assumed to be 3.5 $\mu m^2$.

As shown in FIG. 3B, the physical dimension to be applied shown in FIG. 1 is assumed to be "Bit Cell Area" and the condition to be applied shown in FIG. 2 is assumed to be "Direction", which is the first geometric feature.

As a result, the directions (gate width directions) in which the gates of the plurality of transistors composing the bit cells extend are set to specified directions in which conditions for lithography are optimized.

Thus, in the SRAM device according to the first embodiment, the bit cell area has been set to have different values depending on the gate width directions of the transistors composing the bit cells.

A detailed description will be given to the specified directions on the chip 10 with reference to the drawings.

Figure 4:
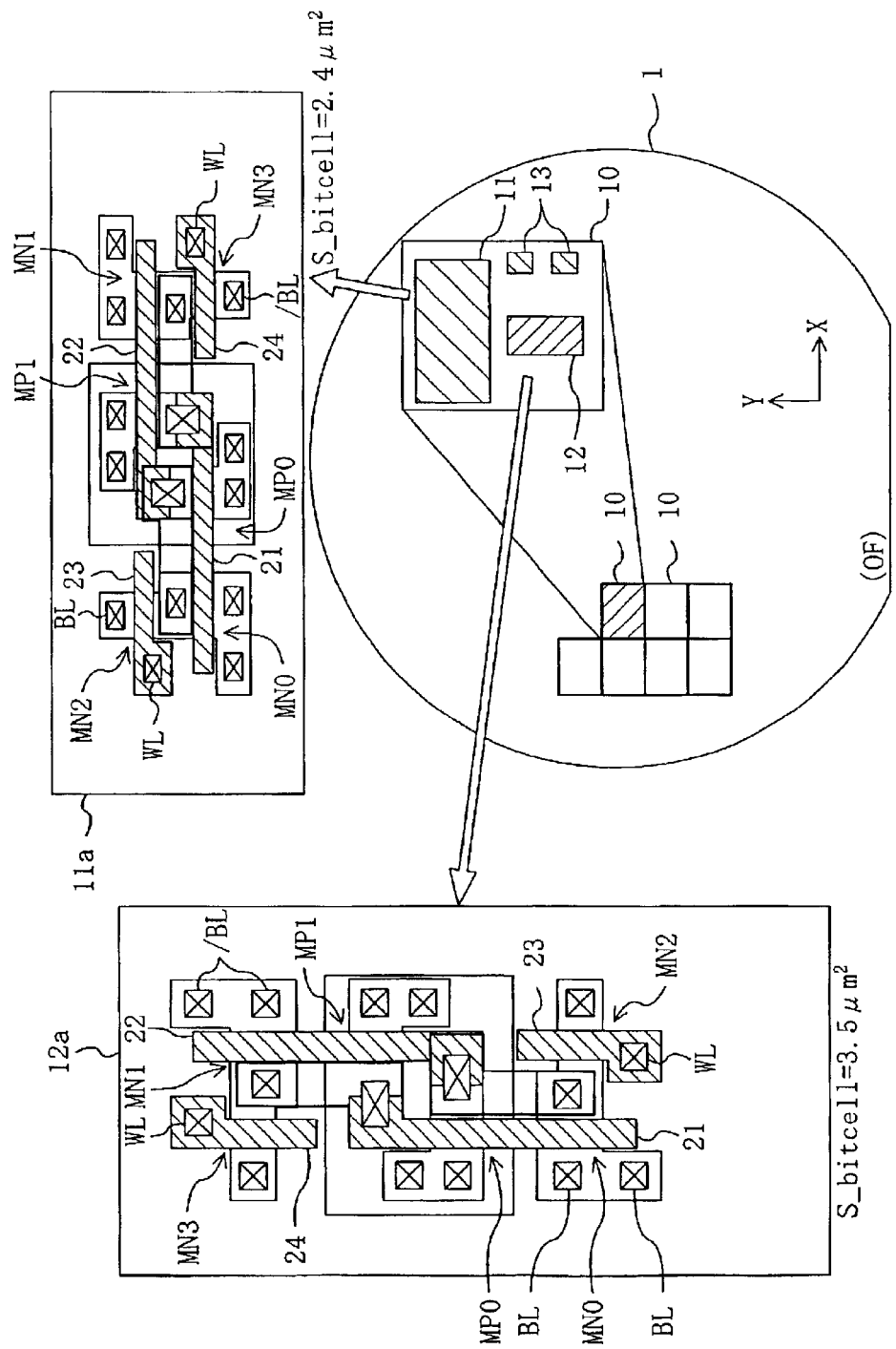
FIG. 4 is a plan view diagrammatically showing the chip shown in FIG. 3A which is formed on a wafer and bit cells contained in the SRAM blocks formed on the chip.

FIG. 4 diagrammatically shows each of the plurality of chips 10 which is formed on a wafer 1. As shown in FIG. 4, a bit cell 11a contained in the first SRAM block 11 has six transistors MN0, MN1, MN2, MN3, MP0, and MP1.

As has been well known, the first n-type drive transistor MN0 and the first p-type load transistor MP0 constitute a first CMOS inverter, while the second n-type drive transistor MN1 and the second p-type load transistor MP1 constitute a second CMOS inverter. Each of the first and second inverts has an input node connected in cross-coupled relation to the output node of the other.

The first access transistor MN2 is connected to the output node of the first CMOS inverter, while the second access transistor MN3 is connected to the output node of the second CMOS inverter.

The first N-type drive transistor MN0 and the first P-type load transistor MP0 share a first gate 21, while the second N-type drive transistor MN1 and the second P-type load transistor MP1 share a second gate 22.

The third gate 23 of the first access transistor MN2 having a drain shared by the first N-type drive transistor MN0 and the first P-type load transistor MP2 is provided in parallel with the first and second gates 21 and 22.

Likewise, the fourth gate 24 of the second access transistor MN3 having a drain shared by the second N-type drive transistor MN1 and the second P-type load transistor MP1 is also provided in parallel with the first and second gates 21 and 22.

Thus, the respective gates 21 to 24 of the six transistors MN0, MN1, MN2, MN3, MP0, and MP1 have their gate width directions coincident with the direction of the X axis which is parallel with, e.g., the orientation flat (OF) of the wafer 1.

On the other hand, a bit cell 12a contained in the second SRAM block 12 has the same structure as the bit cell 11a, as shown in FIG. 4. In the drawings, like parts are designated by like reference numerals. Each of the first to fourth gates 21 to 24 composing the bit cell 12a has its gate width direction oriented in the direction of the Y axis. Consequently, the gate width directions of the first to fourth gates 21 to 24 composing the bit cell 12a are orthogonal to the gate width directions of the first to fourth gates 21 to 24 composing the bit cell 11a.

This optimizes the conditions for lithography performed with respect to the first SRAM block 11 having the gates extending in the direction of the X axis and reduces gate-related dimensions, e.g., a gate length, a gate-to-gate spacing, a gate-to-contact spacing, and the like, compared with those of the transistors contained in the second SRAM block 12. As a result, the area occupied by the bit cell in the first SRAM block 11 can be reduced to 2.4 μm, which is smaller than the area occupied by the bit cell in the second SRAM block 12.

In the second SRAM block 12, on the other hand, the longitudinal directions of the parts in the design patterns coincide with the direction of the Y axis. Accordingly, the dimensions including the gate length and the gate-to-contact spacing should be increased. As a result, the area occupied by the bit cell in the second SRAM block 12 is increased to 3.5 μm, which is larger than the area occupied by the bit cell in the first SRAM block 11.

In performing, e.g., patterning for determining the respective gate lengths of the gates 21 to 24 in the first and second SRAM blocks 11 and 12, it is generally difficult to suppress patterning variations in a lithographic step and in an etching step in all directions, i.e., without specifying the direction to the direction of the X axis or the Y axis.

Since the first embodiment can retain required patterning accuracy by specifying the directions (gate width directions) in which the gates extend to the direction of the X axis in at least one of the plurality of functional blocks and preferentially optimizing the conditions for lithography in the specified direction, it can achieve an access time, a low leakage current, or the like required for the bit cell 11a.

In this case, the conditions for lithography in another direction deviated from the specified direction, e.g., in the direction of the Y axis have not been optimized. Therefore, patterning accuracy, i.e., the maximum size value of the design pattern should be sacrificed. For the bit cell 12a which is laid out to have the gate width directions oriented in a direction involving the sacrifice, i.e., only in the direction of the Y axis, the dimensions including the gate lengths and the gate-to-contact spacings are increased even at the expense of a reduction in the area occupied by the bit cell 12a such that the circuit elements are machined exactly as designed.

As shown in FIG. 3, the first SRAM block 11 has a large memory capacity and occupies a large area on the chip 10, while the second SRAM block 12 has a small memory capacity and occupies an area smaller than that occupied by the first SRAM block 11 on the chip 10. In the first SRAM block 11, therefore, the conditions for lithography and etching are optimized by giving a higher priority to gate width directions so that the maximum size value which reduces the bit cell area is applied thereto. To the second SRAM block 12 which should be sacrificed in terms of process conditions, on the other hand, the minimum size value larger than the minimum size value applied to the first SRAM block 11 is applied.

Thus, according to the first embodiment, the layout of the first SRAM block 11 which has a large capacity and in which the bit cell area is to be further reduced is limited to a specified direction. To the second SRAM block 12 free from the limitation and having a smaller memory capacity, a relatively large bit cell area is applied. This reduces the area of each of the first and second SRAM blocks 11 and 12 so that the area of the chip 10 is reduced resultantly.

Although the first embodiment has described the SRAM blocks formed in the semiconductor integrated circuit device, the functional blocks are not limited to the SRAM blocks.

Embodiment 2

A second embodiment of the present invention will be described herein below with reference to the drawings.

Figure 5:
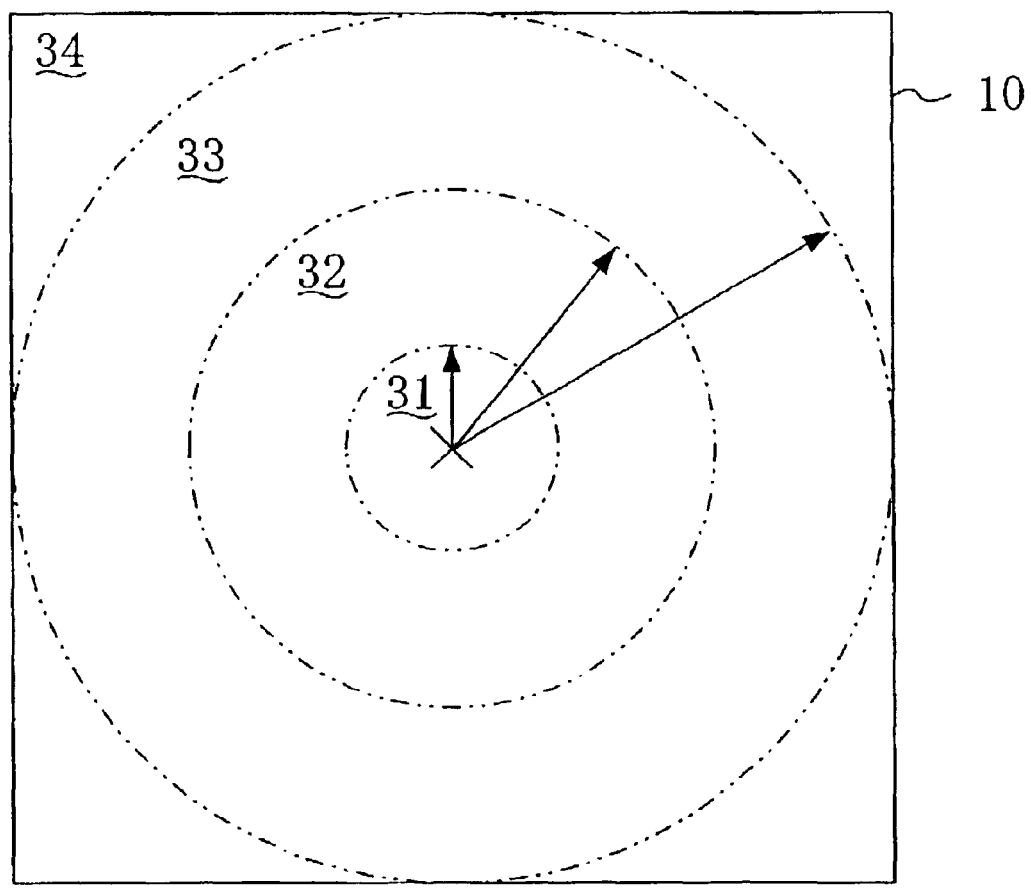
FIG. 5 is a plan view diagrammatically showing a chip-like semiconductor integrated circuit device according to a second embodiment of the present invention.

FIG. 5 diagrammatically shows a plan structure of a chip-like semiconductor integrated circuit device according to the second embodiment.

In the second embodiment, the physical dimension to be applied shown in FIG. 1 is assumed to be "Relative Design-Rule Sizes" and the condition to be applied shown in FIG. 2 is assumed to be "Position or Region".

As shown in FIG. 5, the principal surface of the chip 10 is partitioned into first, second, third, and fourth regions 31, 32, 33, and 34 at every given radial distance from the center of the chip 10. Based on the sizes of the elements and the spacing between the individual parts of the elements to be applied to the first region 31 positioned at the central portion of the chip 10, e.g., the sizes of the elements or the parts thereof contained in the second to fourth regions 32 to 34 are increased gradually outwardly.

For example, the F value and the bit cell area in the first region 31 are assumed to be 1.0 and 2.4 $\mu m^2$, respectively. Since the relative design-rule sizes shown in FIG. 1 are directly proportional to the square of the F value, if the F value in the second region 32 is assumed to be 1.1, the bit cell area therein becomes 2.9 $\mu m^2$. If the F value in the third region 33 is assumed to be 1.2, the bit cell area therein becomes 3.46 $\mu m^2$. If the F value in the fourth region 34 is assumed to be 1.3, the bit cell area therein becomes 4.06 $\mu m^2$.

Thus, the second embodiment has optimized the conditions for lithography or etching by setting priorities in accordance with the distances from the center of the chip 10. Conversely, if the conditions for lithography or the like are optimized in accordance with the distances from the outer region of the chip 10, i.e., from the fourth region 34 toward the first region 31, the F value in the first region 31 becomes highest among the F values in the first to fourth regions 31 to 34.

In another example, the gate length L in the first region 31 is assumed to be 0.15 μm and the operating frequency of an SRAM circuit therein is assumed to be 160 MHz. In the second region 32, the gate length L and the operating frequency of the SRAM circuit are assumed to be 0.18 μm and 80 MHz, respectively. In the third region 33, the gate length L and the operating frequency of the SRAM circuit are assumed to be 0.20 μm and 40 MHz, respectively.

As stated previously, only one process condition has been applied conventionally throughout one chip (wafer) so that the process condition is determined by the minimum condition in the chip 10. As a result, one type of bit cells each having a minimum size value have been formed conventionally on one chip.

By contrast, the present invention allows size variations on the chip 10 during micro-patterning to be complemented at a design stage by physical dimensions to be applied which are capable of suppressing the variations so that the area of the chip is reduced.

Although the second embodiment has used the SRAM device as the semiconductor integrated circuit device, the present invention is not limited to an SRAM device.

Embodiment 3

A third embodiment of the present invention will be described herein below with reference to the drawings.

Figure 6:
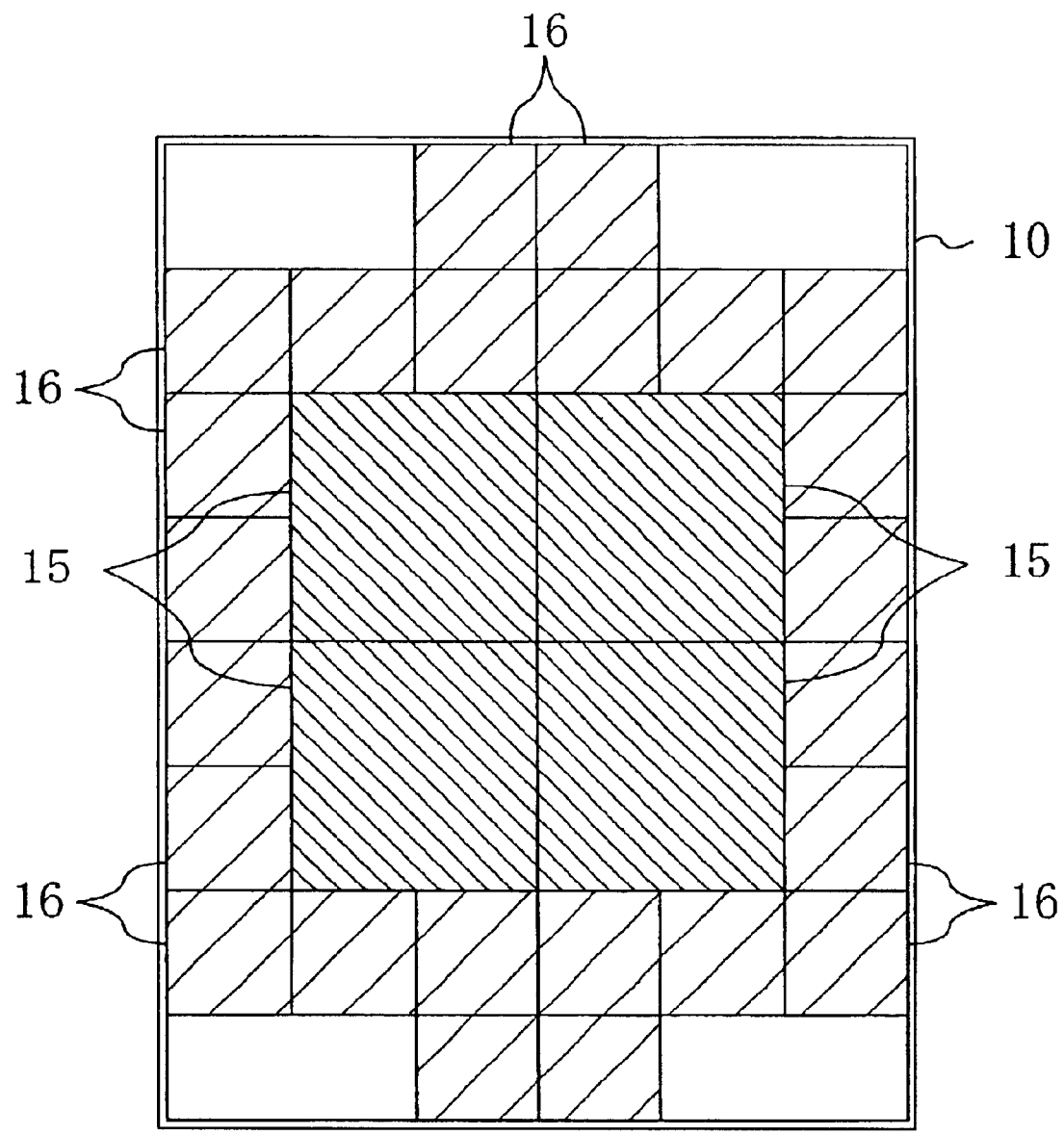
FIG. 6 is a plan view diagrammatically showing a chip-like semiconductor integrated circuit device according to a third embodiment of the present invention.

FIG. 6 diagrammatically shows a plan structure of a chip-like semiconductor integrated circuit device according to the third embodiment. In the third embodiment also, the physical dimension to be applied shown in FIG. 1 is assumed to be "Relative Design-Rule Sizes" and the condition to be applied is assumed to be "Position or Region", which is the first geometric feature, in the same manner as in the second embodiment.

As shown in FIG. 6, a plurality of first functional blocks 15 are disposed at the central portion of the principal surface of the chip 10 and a plurality of second functional blocks 16 each occupying an area smaller than the area occupied by each of the first functional blocks 15 are disposed around the plurality of first functional blocks 15.

The following is the relationship between the respective sizes of the functional blocks 15 and 16 and a margin for allowable micro-patterning variations.

(1) If the size of a block is large, as that of the first functional block 15, an absolute amount of variation in wiring resistance or wiring capacitance is large so that an operating margin for micro-patterning variations is small.

(2) If the size of a block is small, as that of the second functional block 16, an absolute amount of variation in wiring resistance or wiring capacitance is small so that an operating margin for micro-patterning variations is large.

If the distance from the center of the chip 10 is dependent on the magnitude of micro-patterning variation, the second functional blocks 16 smaller in size are disposed preferentially on the peripheral region of the chip 10 where variations are large. On the other hand, the first functional block 15 larger in size are disposed preferentially on the central region of the chip 10 where variations are small.

By way of example, the F value in each of the first and second functional blocks 15 and 16 is assumed to be 1.0, while the respective areas occupied by the first block 15 and the second block 16 are assumed to be 15 mm$^2$ and 3 mm$^2$.

Embodiment 4

A fourth embodiment of the present invention will be described herein below with reference to the drawings.

In the fourth embodiment, the physical dimension to be applied shown in FIG. 1 is assumed to be "Relative Design-Rule Size" and the condition to be applied shown in FIG. 2 is assumed to be "Layout Density", which is a second geometric feature.

The second geometric feature is the layout density of the circuit elements or wires on the substrate. Since the minimum size values of the design patterns according to the fourth embodiment have been set to correct the dependence of the finished sizes on the layout density, the minimum size values are not uniform with respect to the plurality of design patterns so that a plurality of minimum size values exist.

The layout density used herein relates to whether or not an isolated pattern exists in the design pattern. The layout density is judged to be high if consecutive patterns, not an isolated pattern, of wires, the gates of transistors, contacts, and the like exist. If consecutive patterns do not exist and only an isolated pattern exists, the layout density is judged to be low.

An example of a functional block relatively high in layout density is a memory device such as an SRAM device. Not only the memory cell array portion of the memory device which is composed of a plurality of memory cells arranged as a matrix but also the peripheral circuit portion thereof have high layout densities. Conditions for lithography and etching are optimized more easily in the region at a high layout density than in a region at a low layout density. This allows design sizes to be reduced.

Embodiment 5

A fifth embodiment of the present invention will be described herein below with reference to the drawings.

Figure 7:
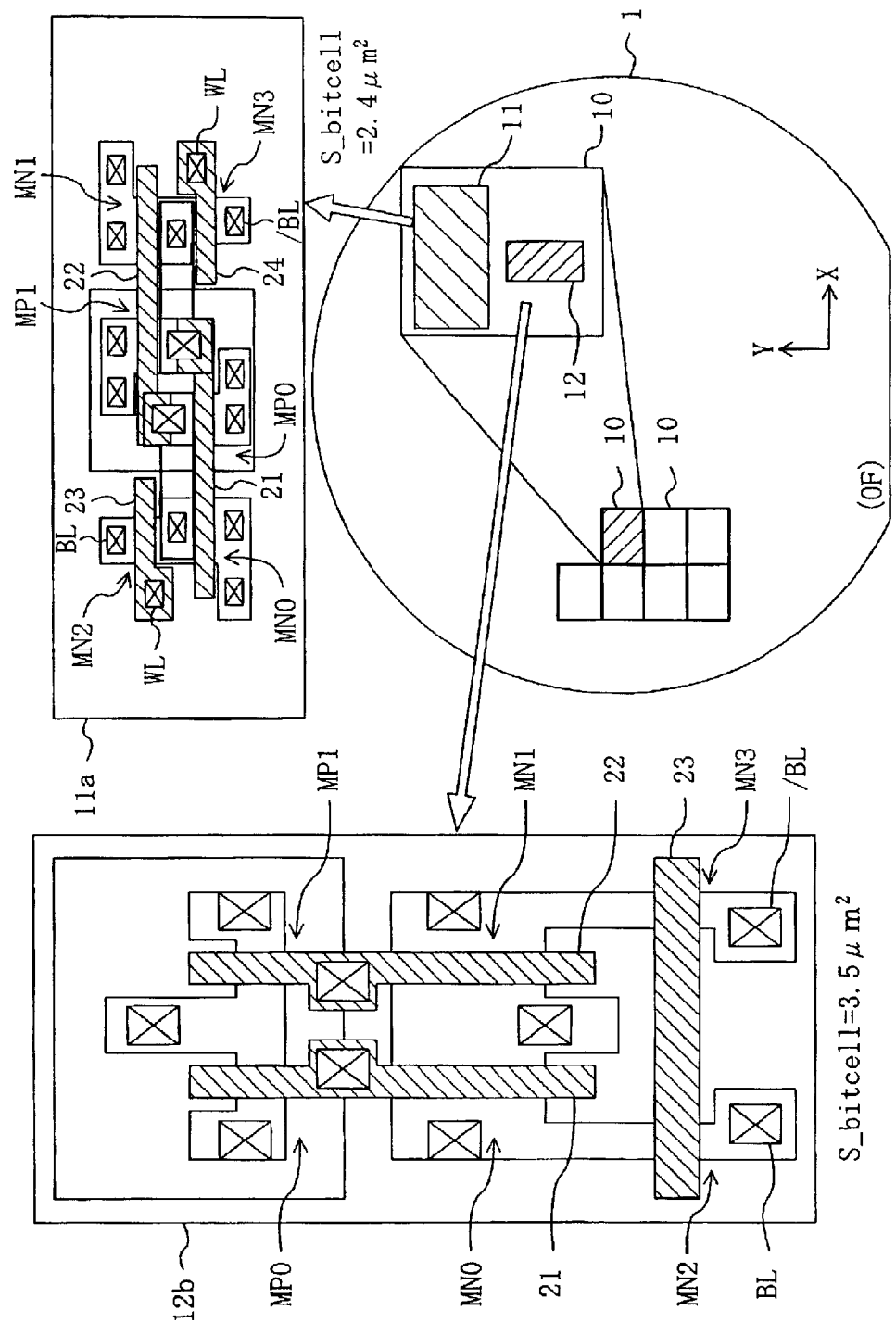
FIG. 7 is a plan view diagrammatically showing a chip-like semiconductor integrated circuit device according to a fifth embodiment of the present invention which is formed on a wafer and bit cells contained in SRAM blocks formed on the chip.

FIG. 7 shows a plan structure of a chip-like semiconductor integrated circuit device according to the fifth embodiment and bit cells contained in SRAM blocks formed on the chip. In FIG. 7, the description of the same parts as shown in FIG. 4 will be omitted by retaining the same reference numerals.

In the fifth embodiment, the physical dimension to be applied shown in FIG. 1 is assumed to be "Bit Cell Area" and the condition to be applied shown in FIG. 2 is assumed to be "Layout of Bit Cells".

The third geometric feature is the layout type of bit cells in a memory device. Since the minimum size values according to the fifth embodiment are set to correct the dependence of the finished sizes on the relationship between the gate width directions and the direction in which word lines extend in the bit cells, the minimum sizes are not uniform with respect to the plurality of design patterns so that a plurality of minimum sizes exist.

As shown in FIG. 7, in a bit cell 11a contained in a first SRAM block 11 formed on the chip 10, the gate width direction of each of first to fourth gates 21 to 24 is oriented in the direction of the X axis. Here, a bit cell having a structure in which all gates are arranged in parallel with the word lines (not shown), such as the bit cell 11a, is termed a horizontally elongated bit cell.

On the other hand, in a bit cell 12b contained in a second SRAM block 12 according to the fifth embodiment, a third gate 23 shared by first and second access transistors MN2 and MN3 is substantially a word line, which is oriented in a direction orthogonal to a first gate 21 shared by a first N-type drive transistor MN0 and a first P-type drive transistor MP0 and to a second gate 22 shared by a second N-type drive transistor MN1 and a second P-type drive transistor MP1.

Here, a bit cell having a structure in which the first and second gates 21 and 22 are arranged to cross the third gate 23 (word line), such as the bit cell 12b, is termed a vertically elongated bit cell.

Thus, in optimizing conditions for lithography and etching performed with respect to the chip 10 (wafer 1), if the direction of a gate having a higher priority is allowed to coincide with the gate width direction of the vertically elongated bit cell 11a, a design rule which provides the minimum one of the plurality of minimum size values in the chip 10 can be applied to the bit cell 11a, as shown in the first embodiment, so that the bit cell area is reduced to 2.4 $\mu m^2$.

However, since the gate width directions of the first to third gates 21 to 23 are not the same in the horizontally elongated bit cell 12b, process conditions cannot be optimized for all of the gates 21 to 23 composing the bit cell 12b. Accordingly, it is necessary to apply a design rule larger than that applied to the first SRAM block 11, which is a bit cell area of 3.5 $\mu m^2$.

Although the fifth embodiment has described the SRAM blocks formed in the semiconductor integrated circuit device, the present invention is not limited to SRAM blocks.

Embodiment 6

A sixth embodiment of the present invention will be described herein below with reference to the drawings.

Figure 8:
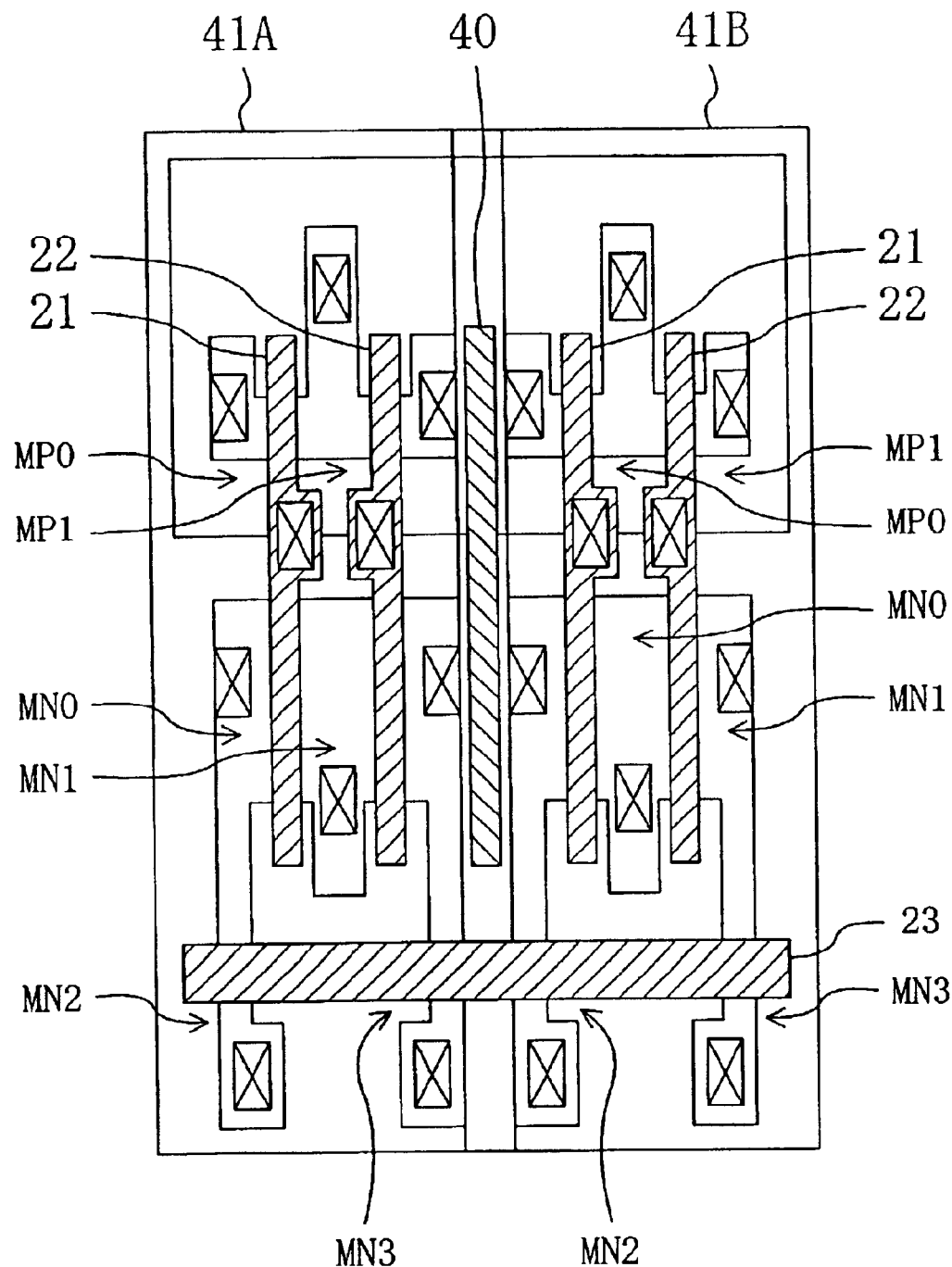
FIG. 8 is a plan view showing a plurality of bit cells contained in an SRAM block formed in a semiconductor integrated circuit device according to a sixth embodiment of the present invention.
Figure 9:
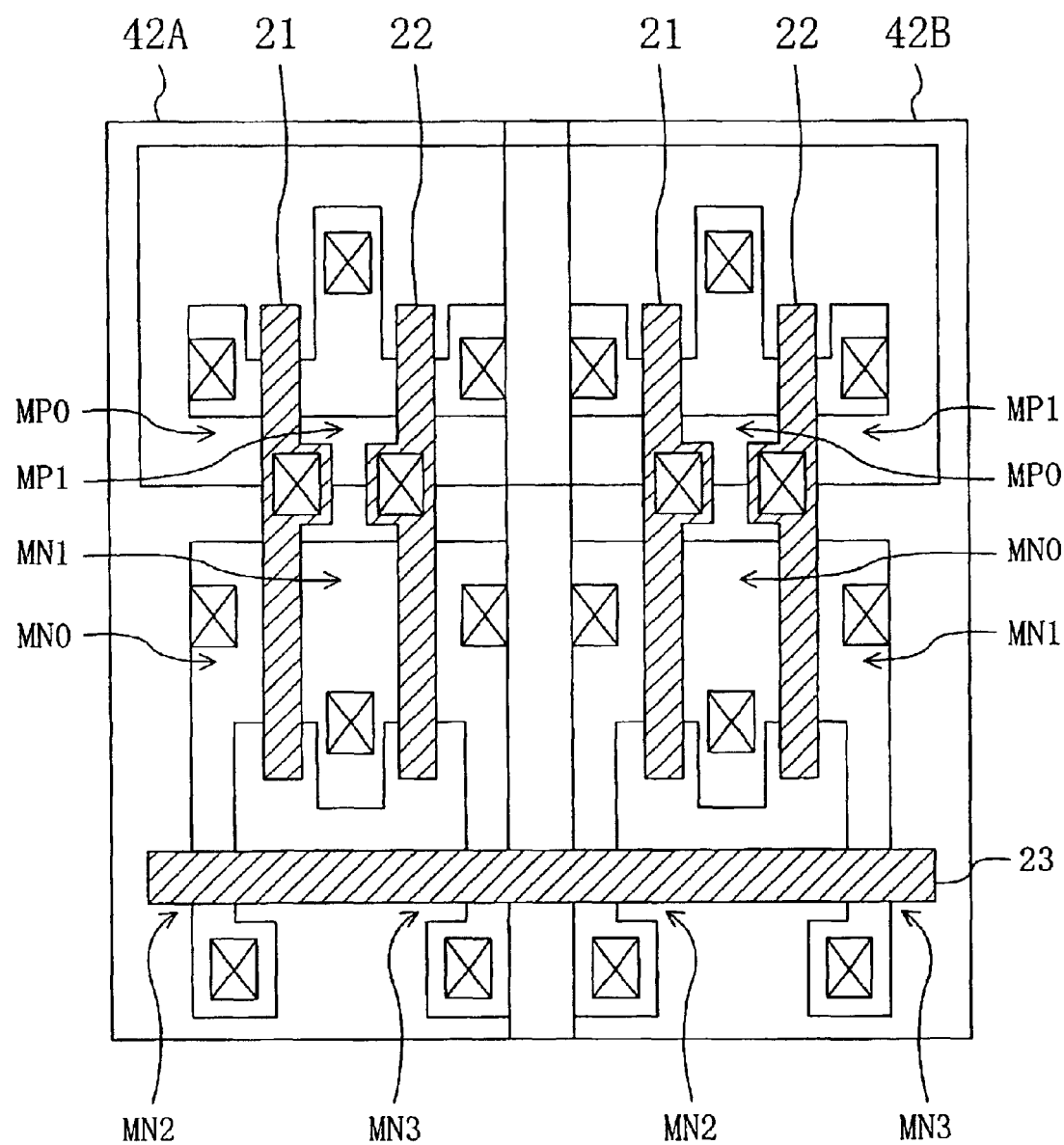
FIG. 9 is a plan view showing a plurality of bit cells contained in an SRAM block formed in a semiconductor integrated circuit device according to the sixth embodiment.

FIGS. 8 and 9 show a plan structure of a plurality of bit cells contained in SRAM blocks formed in a semiconductor integrated circuit device according to the sixth embodiment. In FIGS. 8 and 9, the description of the same parts as shown in FIG. 7 will be omitted by retaining the same reference numerals.

In the sixth embodiment, the physical dimension to be applied shown in FIG. 1 is assumed to be "Bit Cell Area" and the condition to be applied shown in FIG. 2 is assumed to be "Dummy Pattern", which is a fourth geometric feature.

The fourth geometric feature is a dummy pattern contained in the design pattern. The minimum size value is dependent on whether or not the dummy pattern is contained. If the dummy pattern is contained, the minimum size value is set to correct the dependence of the finished size on the dummy pattern. Accordingly, the minimum size values are not uniform with respect to the plurality of design patterns so that a plurality of minimum size values exist.

As shown in FIG. 8, a dummy gate 40 is disposed between adjacent first and second bit cells 41A and 41B in parallel with each of first and second gates 21 and 22.

Each of first and second P-type load transistors MP0 and MP1 composing the first and second bit cells 41A and 41B has a gate length of 0.15 $\mu m$.

By contrast, the dummy gate 40 is not disposed between third and fourth bit cells 42A and 42B adjacent to each other, as shown in FIG. 9. Each of first and second P-type load transistors MP0 and MP1 composing the third and fourth bit cells 42A and 42B has a gate length of 0.18 $\mu m$.

To increase an access speed in an SRAM device, it is generally required to reduce the gate lengths of transistors composing the SRAM device. To reduce the gate lengths, high-precision micro-patterning becomes necessary. Since the conditions for lithography and etching are optimized more easily in a region at a high layout density than in a region at a low layout density, as described in the fourth embodiment, the layout densities of the first and second bit cells 41A and 41B can be increased by disposing a dummy pattern, e.g., the dummy gate 40 in a region where no design pattern exists.

If the dummy gate 40 is to be inserted in each of specified regions, however, automation should be provided and the layout area of dummy patterns is increased disadvantageously. In the bit cells of an SRAM device that have been laid out manually, not automatically, in consideration of symmetry, the dummy gates 40 should also be disposed manually.

In the sixth embodiment, therefore, the dummy gates 40 are disposed only in the SRAM blocks of which higher-speed operation is required through a reduction in gate length, as in the first and second bit cells 41A and 41B shown in FIG. 8. In SRAM blocks of which higher-speed operation is not required as shown in FIG. 9, on the other hand, the gate length is increased instead of providing the dummy gates 40.

If the gate width directions of the first and second bit cells 41A and 41B provided with the dummy gates 40 are oriented in a direction which optimizes process conditions, as in the first embodiment, only the SRAM blocks which should be miniaturized can further be miniaturized.

Although the sixth embodiment has described the SRAM blocks formed in the semiconductor integrated circuit device, the present invention is not limited to SRAM blocks.

Embodiment 7

A seventh embodiment of the present invention will be described herein below with reference to the drawings.

A description will be given to "the case where finished sizes are different depending on electric specifications required of the design patterns and on designing means (methods) for implementing the electric specifications", which is a second concept of the present invention.

Specifically, in the following seventh to twelfth embodiments, the description will be given to the case where, if the design patterns are dependent on the electric specifications and on the designing means (methods) for implementing the electric specifications, a plurality of design rules are applied to each of the first, third, fourth, and fifth design rules shown in FIG. 1.

FIG. 10 shows the characteristics of the electric specifications in the design patterns and the designing means for implementing the electric specifications. As shown in FIG. 10, the characteristic of the first electric specification is "Leakage Current" in the design patterns. Examples of the designing means capable of suppressing "Leakage Current" are power voltage control, power shutdown control, threshold voltage control (substrate potential control or source potential control), and gate-to-source potential difference control.

Specific examples will be described herein below.

Figure 11A:
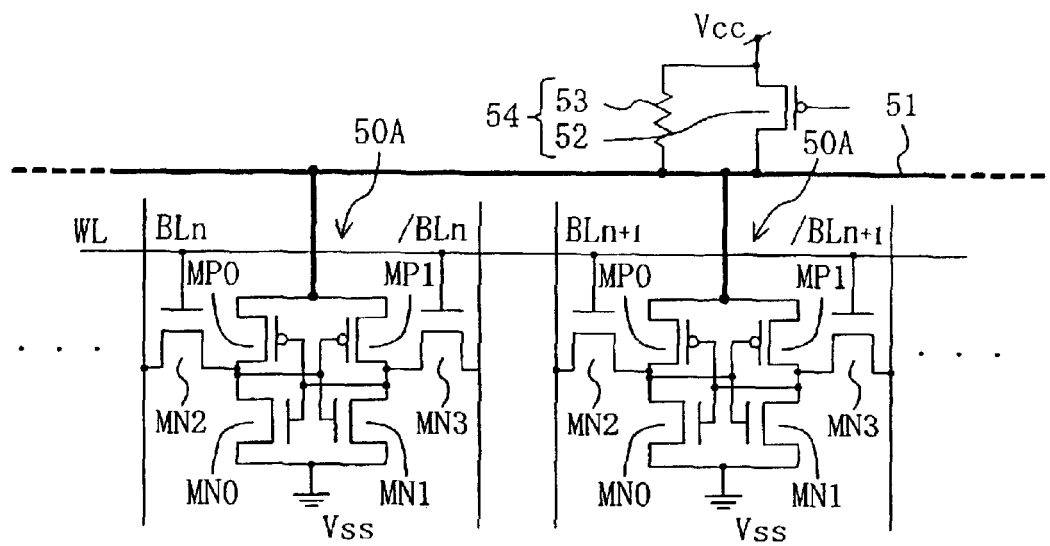
Figure 11B:
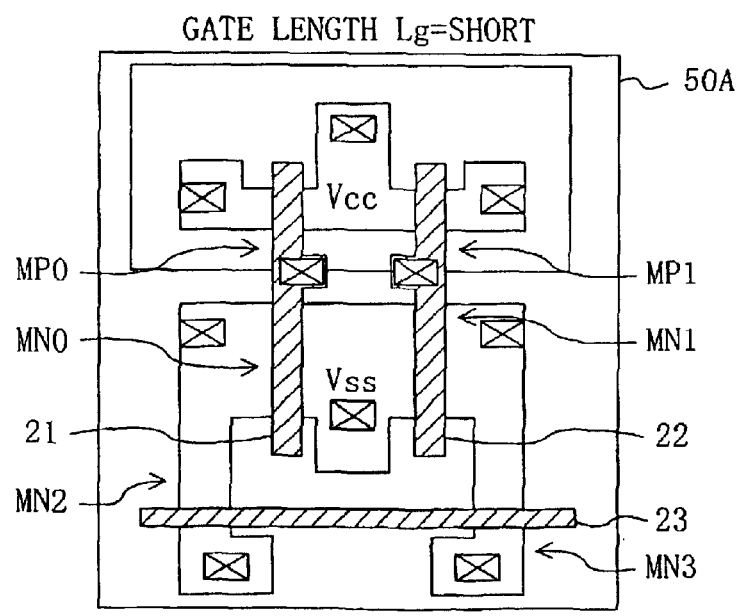

FIGS. 11A and 11B show an SRAM block formed in a semiconductor integrated circuit device according to an eleventh embodiment of the present invention, of which FIG. 11A shows a circuit structure of the SRAM block in which current voltage control is performed and FIG. 11B shows a plan structure of bit cells contained in the SRAM block.

Figure 12A:
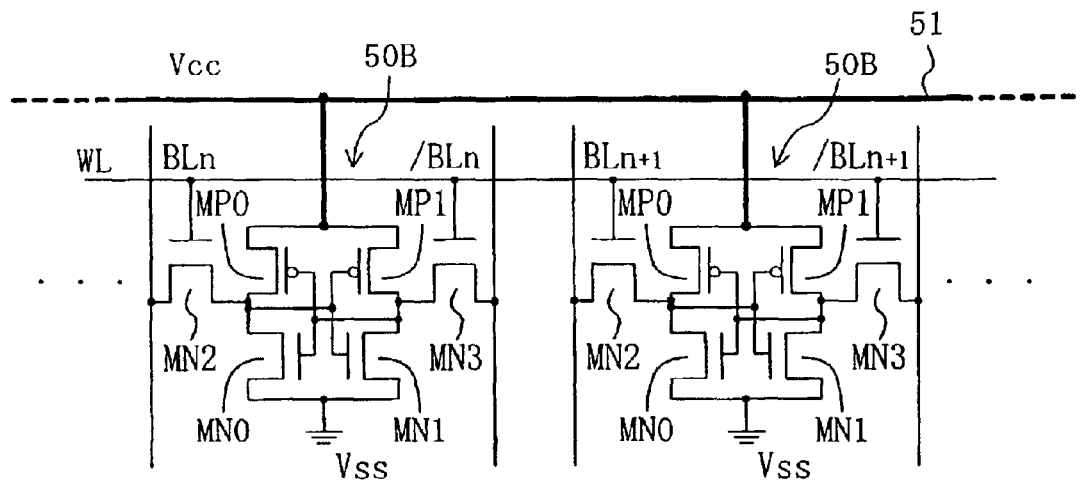
Figure 12B:
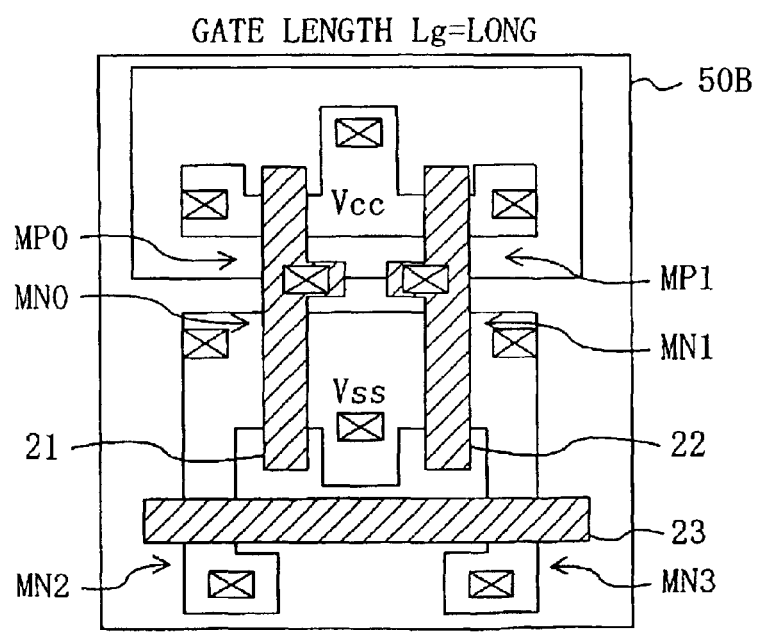

FIGS. 12A and 12B show another SRAM block formed in the semiconductor integrated circuit device shown in FIG. 11A, of which FIG. 12A shows a circuit structure of the SRAM block in which current voltage control is not performed and FIG. 12B shows a plan configuration of bit cells contained in the SRAM block. As shown in FIGS. 11B and 12B, the structures of the bit cells 50A and 50B are the same as the structure of, e.g., the bit cell 12b shown in FIG. 7. In the drawings, like parts are designated by like reference numerals.

In the seventh embodiment, the physical dimension to be applied shown in FIG. 1 is assumed to be "Length/Width" of "Relative design-rule sizes" and the condition to be applied shown in FIG. 10 is assumed to be "Leakage Current", which is the first electric specification.

In a typical SRAM device, a bit line BLn and a complementary bit line /BLn connected to the respective sources of first and second access transistors MN2 and MN3 are precharged to a power supply voltage Vcc so that, if a line adjacent to the bit line BLn or to the complementary bit line /BLn is a line having a potential different from a potential on the bit line BLn or the complementary bit line /BLn, e.g., a ground line to which a ground voltage Vss is applied, a defect at a design stage or during fabrication may cause a short circuit between the adjacent lines. This causes the problem that a leakage current flows between the bit line BLn or the complementary bit line /BLn and the ground line.

To prevent the problem, in a bit cell 50A shown in FIG. 11A, a leakage suppressing circuit 54 composed of a current control switch 52 and a resistor 53 connected in parallel is provided between a power supply for supplying a power supply voltage Vcc to the common source of first and second P-type transistors MP0 and MP1 and a power supply line 51.

During standby, the power supply line 51 is disconnected from the power supply by turning OFF the current control switch 52 so that a leakage current is allowed to flow in the resistor 53. Accordingly, a voltage drop changes an amount of voltage drop depending on the leakage current and the voltage applied to the bit cell 50A lowers automatically so that the leakage current in the bit cell 50A is suppressed.

In accordance with such an electric specification, the bit cell 50A capable of suppressing a leakage current with the leakage suppressing circuit 54 provided therein can suppress an increase in leakage current during standby even if a leakage current is made more likely to flow in the bit cell 50A by applying a design rule which reduces the respective gate lengths Lg of gates 21, 22, and 23 composing the bit cell 50A in order to achieve higher-speed operation of the transistors, as shown in FIG. 11A.

To an SRAM block not provided with the leakage suppressing circuit 54, on the other hand, a design rule which makes the area occupied by the bit cell 50B larger than the area occupied by the bit cell 50A by increasing the respective gate lengths Lg of gates 21, 22, and 23 is applied, as shown in FIG. 12A.

Although the seventh embodiment has described the SRAM block formed in the semiconductor integrated circuit device, the present invention is not limited to an SRAM block.

Embodiment 8

An eighth embodiment of the present invention will be described herein below with reference to the drawings.

In the eighth embodiment, the physical dimension to be applied shown in FIG. 1 is assumed to be "Space" of "Relative Design-Rule Sizes" and the condition to be applied shown in FIG. 10 is assumed to be "Leakage Current", which is the first electric specification.

Figure 13A:
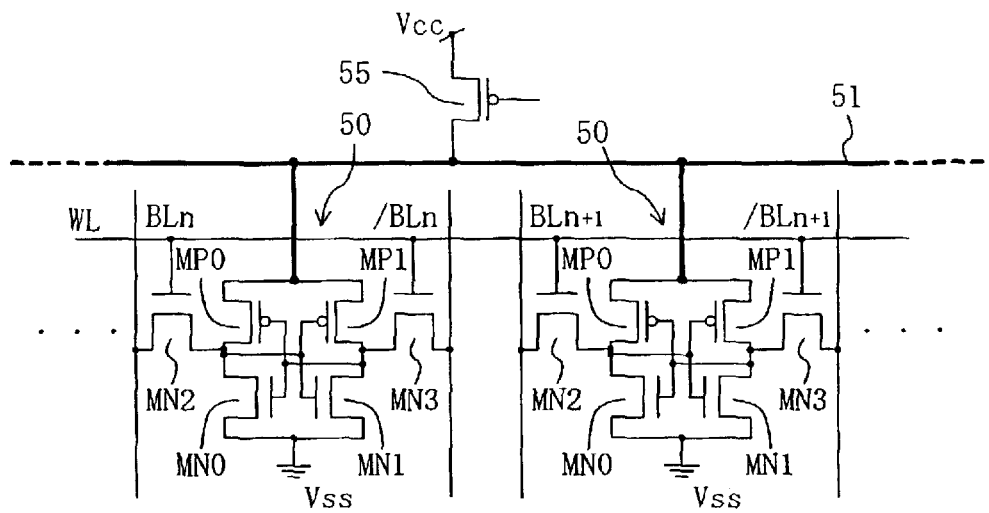
Figure 13B:
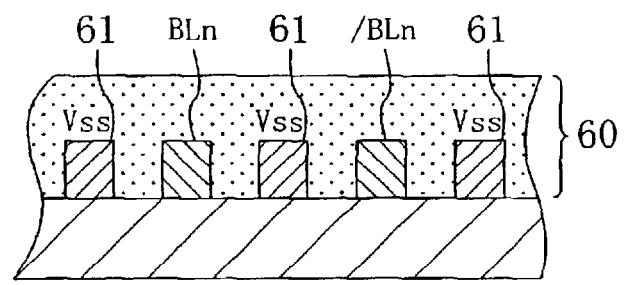
Figure 13C:
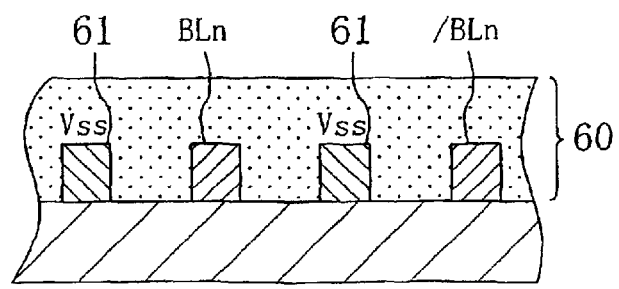

FIGS. 13A to 13C show an SRAM block formed in a semiconductor integrated circuit device, of which FIG. 13A shows a circuit structure of the SRAM block in which power shutdown control is performed and FIGS. 13B and 13C show cross-sectional structures of bit lines and ground lines in the SRAM block.

As shown in FIG. 13A, the structure of a bit cell 50 is the same as that of, e.g., the bit cell 12b shown in FIG. 7. In the drawings, like parts are designated by like reference numerals.

The specification for the bit cell 50 shown in FIG. 13A is such that data need not be retained during standby.

Accordingly, a power shutdown switch 55 is provided between a power supply for supplying a power supply voltage Vcc to the common source of first and second P-type load transistors MP0 and MP1 and a power supply line 51. The power shutdown switch 55 is turned OFF during standby so as not to supply the power supply voltage Vcc to the power supply line 51. On the other hand, the power shutdown switch 55 is turned ON during operation so as to supply the power supply voltage Vcc to the power supply line 51.

In the eighth embodiment also, a plurality of design rules are applied to wiring patterns containing bit lines BLn and /BLn composing the SRAM blocks depending on electric specifications and means (methods) for implementing the electric specifications.

In an SRAM block in which the occurrence of a leakage current during standby is allowed, e.g., the spacings between the bit lines BLn and /BLn formed in one wiring layer 60 and ground lines 61 are relatively reduced so that the area occupied by the bit cell 50 is reduced, as shown in FIG. 13B.

In an SRAM block in which the occurrence of a leakage current during standby is not allowed, on the other hand, the spacings between the bit lines BLn and /BLn and the ground lines 61 are relatively increased at the expense of the area occupied by the bit cell 50, as shown in FIG. 13C.

Instead of increasing the spacings between the bit lines BLn and /BLn and the ground lines 61, it is also possible to lay out power supply lines, not the ground lines 61, and provide the ground lines 61 in another wiring layer different from the wiring layer 60 in FIG. 13C.

Although the eighth embodiment has described the SRAM block formed in the semiconductor integrated circuit device, the present invention is not limited to an SRAM block.

Embodiment 9

A ninth embodiment of the present invention will be described herein below with reference to the drawings.

In the ninth embodiment, the physical dimension to be applied shown in FIG. 1 is assumed to be "Layout of Different-Potential Nodes" and the condition shown in FIG. 10 is assumed to be "Leakage Current", which is the first electric specification.

Figure 14A:
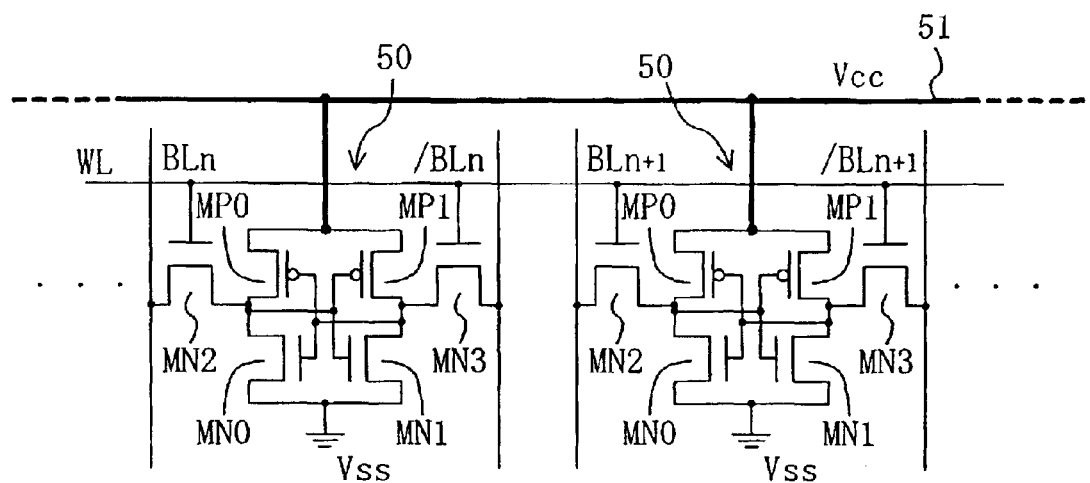
Figure 14B:
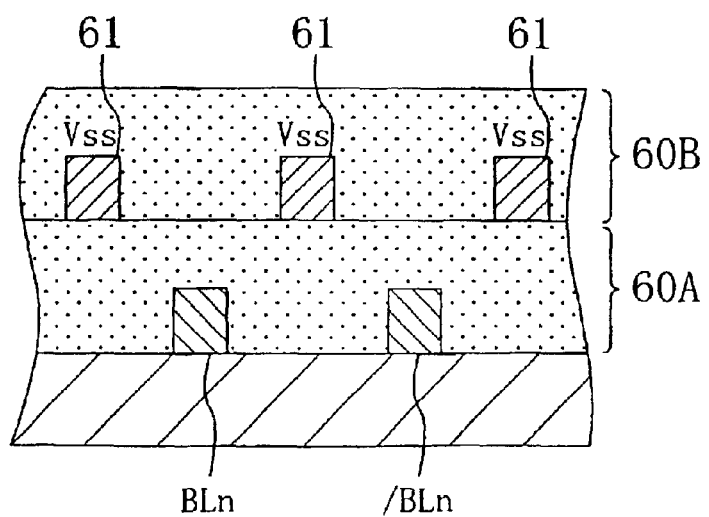

FIGS. 14A and 14B show an SRAM block formed in a semiconductor integrated circuit device, of which FIG. 14A shows a circuit structure of the SRAM block in which power shutdown control is not performed and FIG. 14B shows a cross-sectional structure of bit cells and ground lines in the SRAM block. In FIGS. 14A and 14B, the description of the same parts as shown in FIGS. 13A and 13B will be omitted by retaining the same reference numerals.

Since the specification for the SRAM block according to the ninth embodiment is such that power shutdown control is not performed and data is retained during standby, it does not allow the occurrence of a leakage current during standby.

As shown in FIG. 14B, therefore, bit lines BLn and /BLn composing the SRAM block are formed in a first wiring layer 60A, while ground lines 61 are formed in a second wiring layer 60B formed on the first wiring layer 60A.

By thus separately providing lines at different potentials in the different wiring layers 60A and 60B, a leakage current can surely be suppressed.

It is to be noted that a design rule value for the bit lines BLn and /BLn in the first wiring layer 60A may be the same as or different from a design rule value for the ground lines 61 in the second wiring layer 60B. It is also possible to form the ground lines 61 in the first wiring layer 60A and form the bit lines BLn and /BLn in the second wiring layer 60B.

Although the ninth embodiment has described the SRAM block formed in the semiconductor integrated circuit device, the present invention is not limited to an SRAM block.

Embodiment 10

A tenth embodiment of the present invention will be described herein below with reference to the drawings.

In the tenth embodiment, the physical dimension to be applied shown in FIG. 1 is assumed to be "Bit-Cell Area" and the second electric specification shown in FIG. 10 is assumed to be "Operating Speed and Clock Frequency". Designing methods which allow the determination of "Operating Speed and Clock Frequency" are delay control effected by power supply voltage control, delay control effected by threshold voltage control, and RC delay control effected by using variations in the number of wiring layers used in a layout.

By way of example, a description will be given to a structure which performs feedback control over a power supply voltage, a substrate voltage, or the like in a monitor circuit such that a clock frequency serving as a basis for circuit operation and the frequency of the monitor circuit have a specified relationship therebetween, such as a phase locked loop (PLL).

The monitor circuit is a delay control circuit capable of controlling a power supply voltage or a substrate voltage. Even if the gate lengths of transistors contained in an SRAM block become excessively short or long due to micro-patterning variations and a signal delay time varies, an amount of delay in signal propagation time can be corrected by the monitor circuit.

In an SRAM block having such a monitor circuit, even if a leakage current becomes more likely to flow as a result of reduced gate lengths when operational speed is to be increased by reducing the gate lengths of the individual gates, as in the bit cell 50A contained in the SRAM block shown in FIG. 11B, the provision of a leakage suppressing circuit 54 can suppress an increase in leakage current during standby.

Thus, the tenth embodiment reduces the gate lengths of the individual transistors in the SRAM block provided with the monitor circuit and thereby provides a logic cell having a small bit cell area and capable of performing high-speed operation, while suppressing variations in operating speed.

On the other hand, the tenth embodiment increases the gate lengths of individual transistors in an SRAM block unprovided with a monitor circuit, as in the bit cell 50B contained in the SRAM block shown in FIG. 12B, and thereby provides a logic cell having a large bit cell area and small variations in operating speed.

Although the tenth embodiment has described the SRAM block formed in the semiconductor integrated circuit device, the present invention is not limited to an SRAM block.

Embodiment 11

An eleventh embodiment of the present invention will be described herein below with reference to the drawings.

The eleventh embodiment will refer to "Timing Values (a set-up value and a hold value for a clock signal) in the design patterns, which are characteristic of a third electric specification shown in FIG. 10. Designing methods which allow the determination of "Timing Values" are RC delay control effected by using variations in the number of wiring layers used in a layout, selection of synchronous design/asynchronous design, the gate length of a delay circuit transistor for timing adjustment, and a layout which adjusts a distance from a clock driver. The set-up value is defined herein as a time interval between a reference time determined by the clock signal and a time at which a data value should be determined prior to the reference time and the hold value is defined herein as a time during which the determined data value is held.

(1) RC Delay Control Effected by Using Variations in Number of Wiring Layers Used in Layout Of the designing methods which satisfy the timing values of the electric specification, RC delay control effected by using variations in the number of wiring layers used in a layout will be described first.

Each of SRAM blocks formed on one chip has a four-layer structure irrespective of the number of wiring layers of the entire chip (normally four to seven layers) such that the chip provides for any number of layers.

If an SRAM block as shown in FIG. 11A is formed on a chip of which a specification for the number of wiring layers is five to seventh layers, three wiring layers at the maximum are added to the original four layers to provide for a higher speed operation or a smaller area required of the SRAM block so that the SRAM block is designed as four to seven wiring layers.

In an SRAM block of which a higher speed and a smaller area on the chip are required, multilayer wiring is used in a technically affordable range so that a wire between other functional blocks in a wiring layer overlying another wiring layer is not contained in the underlying layer.

Under such a condition that the gate lengths of individual gates in a bit cell increase, the eleventh embodiment increases the gate lengths and increases the number of wiring layers, thereby compensating for a reduction in operating speed and an increase in bit cell area.

Under such a condition that the gate lengths of individual gates in a bit cell do not increase, on the other hand, the eleventh embodiment reduces the gate lengths, thereby satisfying an operating speed required and also reducing the area occupied by the bit cell. In this case, however, layout is performed such that the maximum number of wiring layers in the SRAM block is four and a wire providing a connection between other functional blocks is positioned above the SRAM block.

The following is an answer to the question of whether the influence of micro-patterning variations on the timing values is increased or decreased by variations in the number of wiring layers used in a layout. Since multilayer wiring containing a larger number of layers reduces a total length of wiring and a wiring density, the absolute values of resistance and capacitance can be reduced. Even if micro-patterning variations occur at a given rate in a portion of each of the wiring layers, therefore, the influence of the variations is negligible since the absolute value of the variation occurred is small.

If the flexibility of the multilayer wiring is high depending on the relationship between adjacent functional blocks, therefore, the absolute values of resistance and capacitance are reduced by using multilayer wiring containing a maximum permissible number of layers in designing a chip. This reduces an absolute amounts of the timing values even if the functional block is disposed in a region of the chip where micro-patterning variations are relatively large.

If the flexibility of the multilayer wiring is low depending on the relationship between adjacent functional blocks, on the other hand, the functional block is disposed in a region of the chip where micro-patterning variations are relatively small.

This suppresses variations in timing allowance value when the variations are considered in view of the flexibility of multilayer wiring on the chip and the magnitude of the micro-patterning variation.

(2) Selection of Synchronous/Asynchronous Design

Of the designing methods which satisfy the timing values of the electric specification, the selection of synchronous/asynchronous design will be described next.

In synchronous design, it presents a problem whether or not micromaching variations impair the relationship between the set-up time, which is a relative timing difference between the clock signal and a data signal, an address signal, or the like, or the hold time and an allowance value for the set-up time or the hold time.

By contrast, asynchronous design basically receives no influence from micro-patterning variations since a relative timing value, such as the set-up time or the hold time, does not exist.

In terms of limited design time and limited design resources, however, it is nearly impossible to design all functional blocks formed on the chip asynchronously. As a result, functional blocks designed synchronously and functional blocks designed asynchronously exist in mixed relation on the chip.

If the functional blocks designed asynchronously are disposed in the region of the chip where micro-patterning variations are small and the functional blocks designed synchronously are disposed in the region of the chip where micro-patterning variations are large, therefore, variations in timing allowance value when the variations are considered can be suppressed.

(3) Gate Width of Delay Circuit Transistor for Timing Adjustment

Of the designing methods which satisfy the timing values of the electric specifications, the gate width of a delay circuit transistor will be described next.

Because of large micro-patterning variations in the chip, in a delay circuit which should inevitably be disposed in a region where variations in gate width are large, the influence of the variations is reduced by increasing the gate width even at the expense of a circuit area.

In the case where the delay circuit can be disposed in a region where variations in gate width are small, however, the gate width can be reduced by giving a higher priority to a reduction in circuit area.

(4) Layout for Adjusting Distance from Clock Driver

Of the designing methods which satisfy the timing values of the electric specification, a layout for adjusting a distance from a clock driver will be described next.

In general, a plurality of clock drivers are placed at positions on a chip as close as possible to the regions to which a clock signal is supplied. Although the placement of a larger number of clock drivers is advantageous to a design margin in timing design, the area is increased thereby disadvantageously through the tradeoff between the number of clock drivers placed and a circuit area.

If the magnitude of micro-patterning variation has dependence on the distance from the center of the chip, the eleventh embodiment allows the distance from each of the clock drivers to the corresponding one of the regions to which a clock is supplied to have a distribution dependent on the distance from the center of the chip, thereby reducing variations in timing allowance value.

Although the eleventh embodiment has described the SRAM blocks formed in the semiconductor integrated circuit device, the present invention is not limited to SRAM blocks.

Embodiment 12

A twelfth embodiment of the present invention will be described herein below with reference to the drawings.

Figures 15A, 15B:
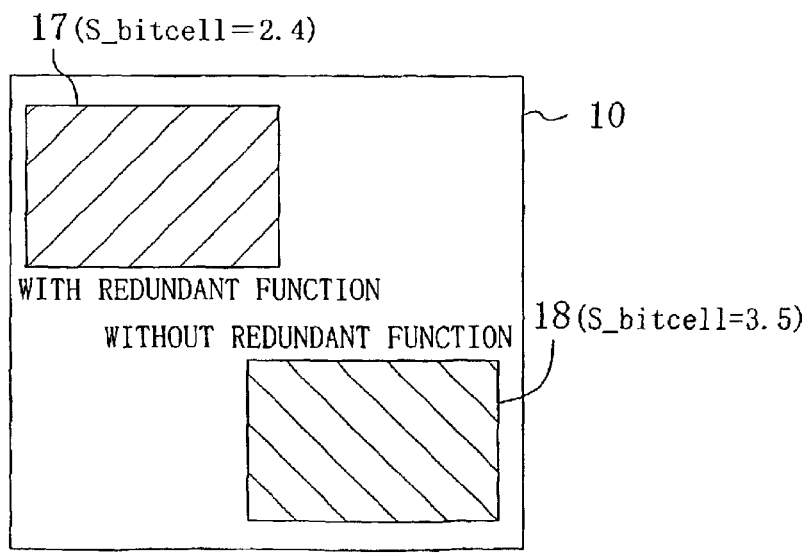
FIG. 15A is a table of physical dimensions and conditions to be applied to design patterns in SRAM blocks formed on a chip-like semiconductor integrated circuit device according to a twelfth embodiment of the present invention.
FIG. 15B is a plan view diagrammatically showing SRAM blocks satisfying the conditions shown in FIG. 15A.

As shown in FIG. 15A, the twelfth embodiment assumes the physical dimension to be applied shown in FIG. 1 to be "Bit Cell Area" and will refer to "Memory Function", which is a fourth electric specification shown in FIG. 10. A designing method for determining "Memory Function" is the determination of whether or not a redundancy function is provided.

FIG. 15B diagrammatically shows a plan structure of a chip-like semiconductor integrated circuit device according to the twelfth embodiment and SRAM blocks formed on the chip.

As shown in FIG. 15B, a first SRAM block 17 having a capacity of 512 kbits and a second SRAM block 18 having a capacity of 512 kbits are formed integrally on a principal surface of the chip 10 composed of, e.g., silicon.

The first SRAM block 17 has a redundancy function and contains bit cells each occupying an area (S-bitcell) of 2.4 $\mu m^2$. On the other hand, the second SRAM block 18 does not have a redundancy function and contains bit cells each occupying an area of 3.5 $\mu m^2$.

Thus, the bit cells contained in the SRAM blocks according to the twelfth embodiment have different areas depending on the presence or absence of the redundancy function in the memory.

Figure 16A:
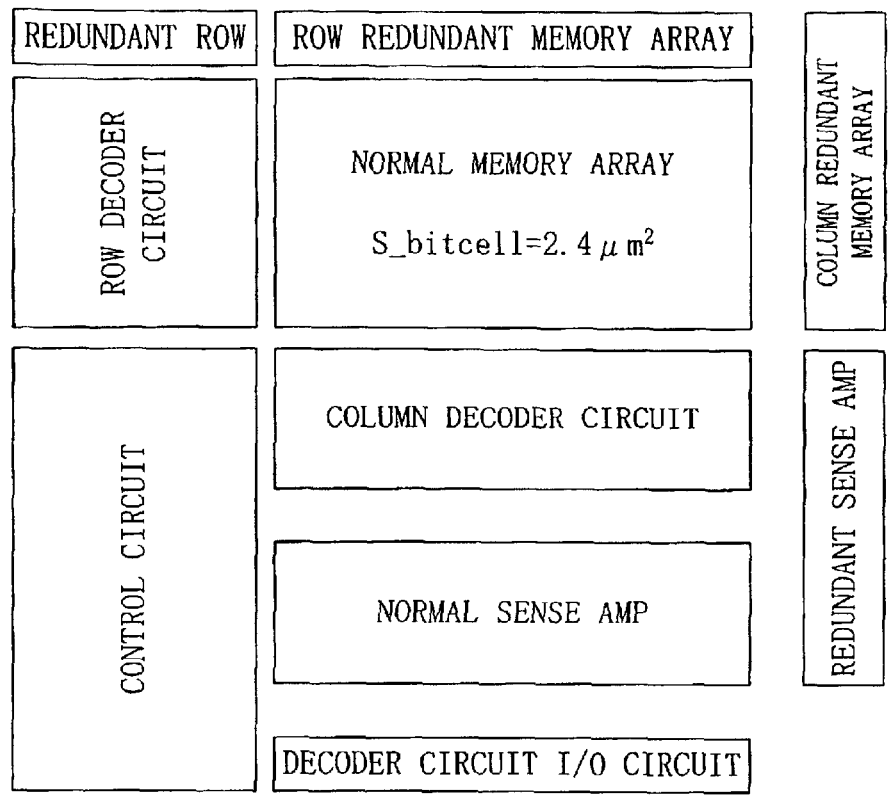
Figure 16B:
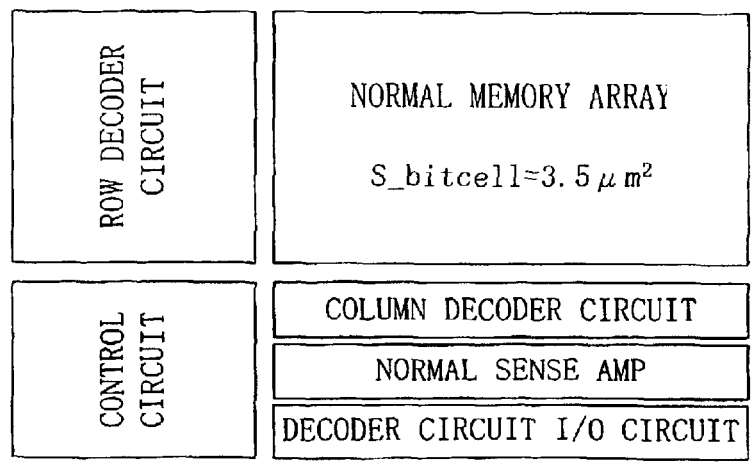

FIG. 16A shows a structure of the SRAM block having the redundancy function. FIG. 16B shows a structure of the SRAM not having the redundancy function. To impart the redundancy function to the SRAM block, redundancy circuits including a redundancy row, a redundancy memory array, and a redundancy sense amp are added as shown in FIG. 16A. As for the area, it is simply increased with the addition of the redundancy circuits.

Even if micro-patterning variations in the fabrication process causes faults in several bits, however, the redundancy function substantially saves the faulty bits by replacing the faulty bits with redundancy bits. Even if a defect density (DD value) is increased by reducing the sizes. of the bit cells at a design stage and reducing a margin when micro-patterning variations are considered, the yield rate of an SRAM portion can be improved if consideration is given to the redundancy function. This achieves a reduction in effective DD value, while achieving a reduction in the area occupied by each of the bit cells, as illustrated in FIG. 17.

Figure 17:
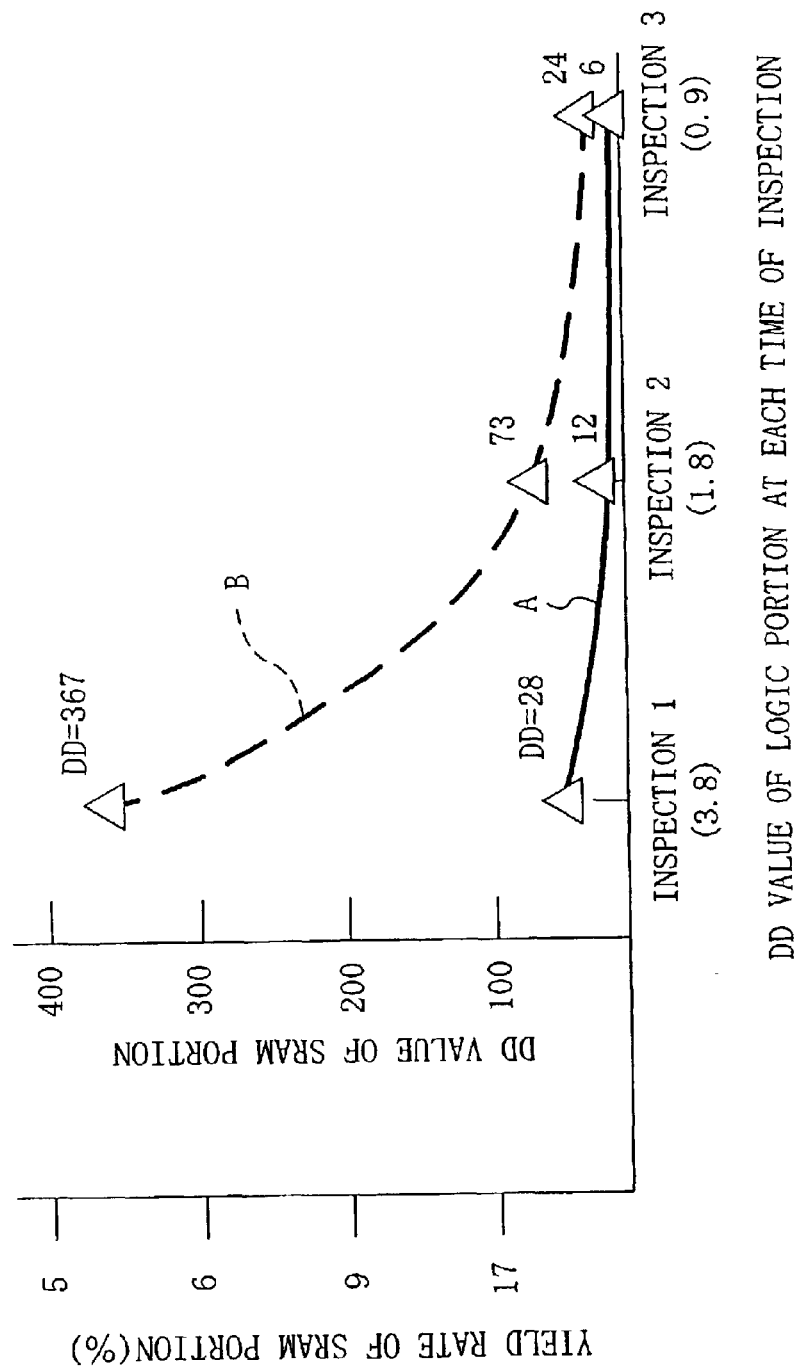
FIG. 17 is a graph showing the relationship between the DD value of a logic portion and the DD value of an SRAM portion in the SRAM blocks according to the twelfth embodiment at each time of inspection.

As shown in FIG. 17, the yield rate is improved greatly in the case where the redundancy function is provided, which is indicated by the solid curve A, and the effective DD value is reduced, compared with the case where the redundancy function is not provided, which is indicated by the broken curve B. By thus selectively using the SRAM blocks depending on the presence or absence of the redundancy function and the magnitude of the bit cell area, the area occupied by the entire chip can be reduced and the production yield can be improved.

If the effective DD value depends on the distance from the center of the chip, it is also possible to determine whether or not the redundancy circuits are provided depending on the distance from the center of the chip.

A description will be given herein below to the relationship between the area occupied by each of the bit cells and the DD value.

(1) To reduce the area occupied by the bit cell, the design pattern sizes of the individual parts, i.e., the gate, the source, the drain, and the like should inevitably be reduced so that the spacing between the wires or the elements is also reduced. This increases the possibility of a fault occurring under the influence of a minor defect or pattern shift and increases the DD value.

(2) The area occupied by the bit cell varies with the number of contacts provided in the bit cell (determination of the number of contacts) and the DD value also varies with the number of contacts provided in the bit cell.

An example of the determination of the number of contacts will be described with reference to FIGS. 18A and 18B.

Figure 18B:
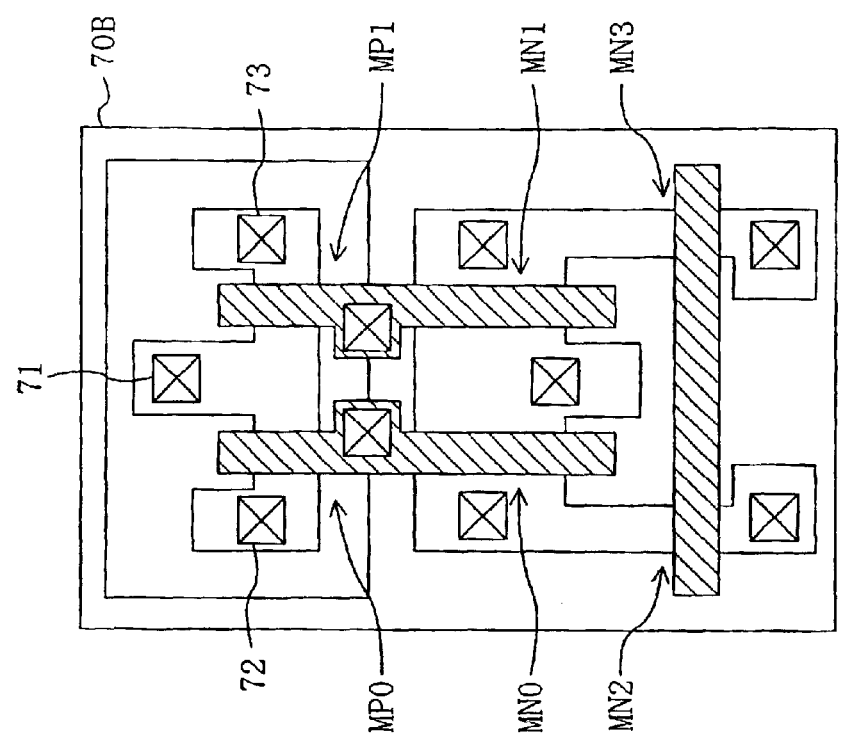
FIG. 18B is a plan view when one contact is provided in a specified region.
Figure 18A:
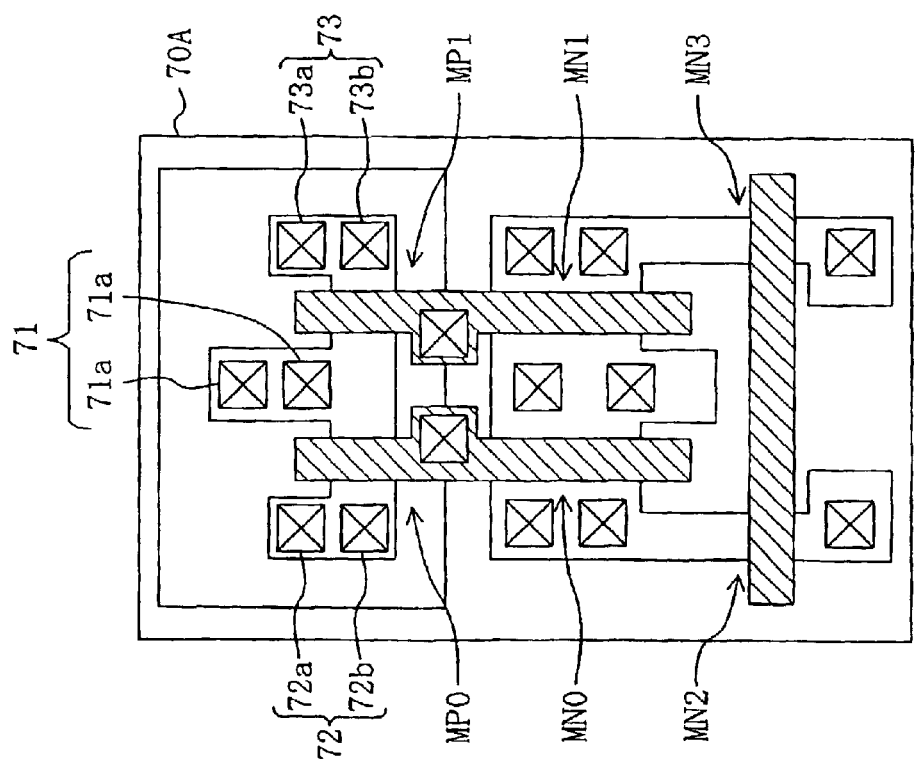
FIG. 18A is a plan view when two contacts are provided in a specified region.

FIG. 18A shows a plan structure of a first bit cell 70A provided with two contacts formed in a specified contact formation region. FIG. 18B shows a plan structure of a second bit cell 70B provided with one contact formed in a specified contact formation region. In FIGS. 18A and 18B, the description of the same parts of the bit cells shown in FIG. 7 will be omitted by retaining the same reference numerals.

As shown in FIG. 18A, if attention is focused only on the P-type transistors of the first bit cell 70A, a P-type source contact 71 provided on the common source of first and second P-type load transistors MP0 and MP1 is composed of first and second contacts 71a and 71b. Likewise, a first P-type drain contact 72 provided on the first P-type load transistor MP0 is composed of first and second contacts 72a and 72b, while a second P-type drain contact 73 provided on the second P-type load transistor MP1 is composed of first and second contacts 73a and 73b.

As shown in FIG. 18B, on the other hand, a P-type source contact 71 provided on the common source of the first and second P-type load transistors MP0 and MP1 of the second bit cell 70B is composed of one contact. Likewise, each of a first P-type drain contact 72 provided on the first P-type load transistor MP0 and a second P-type drain contact 73 provided on the second P-type load transistor MP1 is composed of one contact. Such a relationship is also established in the same manner as in the first and second drive transistors MN0 and MN1 of the first and second bit cells 70A and 70B.

In the case where two contacts are provided on each of the source and drain as in the first bit cell 70A, even if one of the two contacts becomes faulty, the entire bit cell does not become faulty.

In the twelfth embodiment, the contact configuration described in (1) or (2) can be used selectively depending on the presence or absence of the redundancy function.

Although the twelfth embodiment has described the SRAM blocks formed in the semiconductor integrated circuit device, the present invention is not limited to SRAM blocks.

Embodiment 13

A thirteenth embodiment of the present invention will be described herein below with reference to the drawings.

A description will be given to "the case where required specifications differ depending on the usage modes in the design patterns", which is a third concept of the present invention.

Specifically, the description will be given to the case where a plurality of design rules are applied to each of the design rules shown in FIG. 1 according to the usage modes in the design patterns in the thirteenth and fourteenth embodiments.

First, usage modes in a semiconductor integrated circuit device will be described.

If the future trend is toward the formation of a plurality of functional blocks on one chip, it will be a rare case that all functional blocks are used only for one application. If a frame buffer is used as an example, it will be used for various purposes as a frame buffer for display, a frame memory for storing the result of an arithmetic operation for compression or decompression, and the like, so that requirements placed on the frame memory differ.

If other functional blocks are to be designed or fabricated to satisfy the most stringent requirement which is placed with regard to conditions for design or fabrication, high costs should be paid. If a sufficient margin is allowed for micro-patterning variations, as has been allowed conventionally, it becomes possible to uniformly fabricate all the functional blocks and design and test all the functional blocks in accordance with the same specifications.

A description will be given to a method for changing the design rules for a chip in accordance with its various usage modes shown below under situations forming the background of the present invention.

As shown in FIG. 19, the usage modes can be subdivided into the first to eighth usage modes.

In the first usage mode, a one bit fault is tolerated if a circuit element is a memory element. In the second usage mode, data need not be retained during standby. In the third usage mode, it is sufficient to operate for a relatively short period. In the fourth usage mode, an operating speed may be relatively low (operation in a DC manner). In the fifth usage mode, repetitive pattern blocks having identical structures are used. In the sixth usage mode, centroid (point-symmetric) layout is performed. In the seventh usage mode, custom design (high-precision physical design) is performed. In the eighth usage mode, signal transmission (small signal transmission, i.e., a wiring resistance may be high) is performed by a differential operation.

As the thirteenth embodiment, a specific example of "One Bit Fault is Tolerable" in the design patterns will be described.

Figures 20A, 20B:
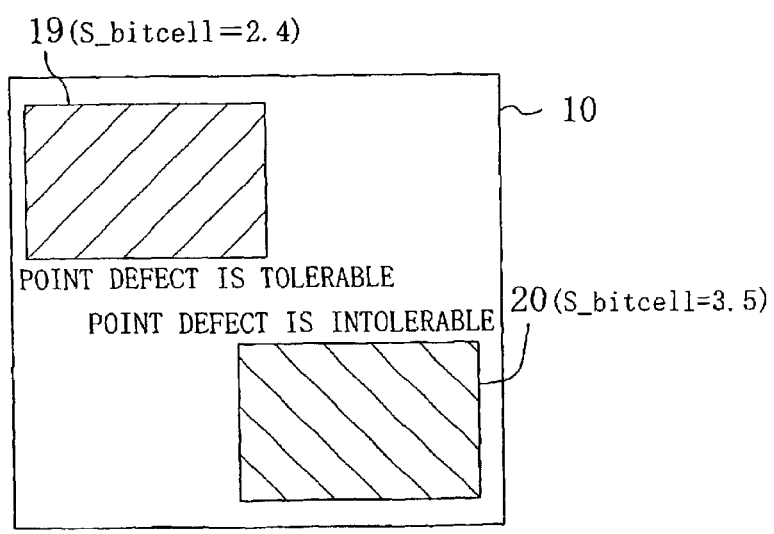
FIG. 20A is a table of physical dimensions and conditions to be applied to design patterns in SRAM blocks formed on a chip-like semiconductor integrated circuit device according to a thirteenth embodiment of the present invention.
FIG. 20B is a plan view diagrammatically showing SRAM blocks satisfying the conditions shown in FIG. 20A.

As shown in FIG. 20A, the thirteenth embodiment assumes the physical dimension to be applied shown in FIG. 1 to be "Bit Cell Area" and will refer to "One Bit Fault is Tolerable" (except for Consecutive Bit Faults), which is characteristic of the first usage mode shown in FIG. 19.

FIG. 20B diagrammatically shows a plan structure of a chip-like semiconductor integrated circuit device according to the thirteenth embodiment and SRAM blocks formed on the chip.

As shown in FIG. 20B, a first SRAM block 19 having a capacity of 512 kbits and a second SRAM block 20 having a capacity of 128 kbits are formed integrally on a principal surface of a chip 10 composed of, e.g., silicon.

The usage mode of the first SRAM block 19 is such that a one bit fault (point defect) is tolerated and the bit cell area (S_bitcell) therein is 2.4 $\mu m^2$, which is relatively small. On the other hand, the usage mode of the second SRAM block 20 is such that a one bit fault (point defect) is not tolerated and the bit cell area (S_bitcell) therein is 3.5 $\mu m^2$, which is relatively large.

For example, in a frame buffer memory used merely for display, not as a frame buffer used for a digital arithmetic operation, 24 bits of color data is required to display each pixel. To represent luminance data, 6 bits are required. Even if a fault has occurred in one of the bits, however, it cannot be discriminated by human eyes.

Even if all the bits representing one pixel are faulty, one pixel in a display device having ten thousands of pixels arranged in 100 rows and 100 columns accounts for only 0.01% of all the pixels, which is at a level unrecognizable by human eyes and therefore tolerated. There is little necessity to incorporate a redundancy function as described in the twelfth embodiment into such a frame buffer memory. Even if it is incorporated, the redundancy function may be disposed appropriately in a region where micro-patterning variations are large.

Specifically, a frame buffer for an application which requires a larger number of pixels rather than a smaller number of point defects, such as the first SRAM block 19 shown in FIG. 20B, needs a relatively large memory capacity so that a reduction in bit cell area is required. In addition, a redundancy function need not be incorporated therein since a point defect is tolerated.

In an SRAM block in which a memory capacity need not be increased but a defect (error) is not tolerated because of its use for a digital arithmetic operation, such as the second SRAM block 20, on the other hand, the probability of a defect is reduced appropriately by relatively increasing the bit cell area.

Thus, according to the thirteenth embodiment, the first SRAM block 19 which has a large capacity, exhibits a high degree of integration, and tolerates a point defect is disposed in a region of the chip 10 where micro-patterning variations are relatively large. By contrast, the second SRAM block 20 which has a smaller capacity than the first SRAM block 19, exhibits a lower degree of integration than the first SLAM block 19, and does not tolerate a point defect is disposed in a region of the chip 10 where variations are relatively small. This reduces each of areas occupied by the first and second SRAM blocks 19 and 20 and resultantly reduces the area of the chip 10.

Although the thirteenth embodiment has described the SRAM blocks formed in the semiconductor integrated circuit device, the present invention is not limited to SRAM blocks.

Embodiment 14

A fourteenth embodiment of the present invention will be described herein below with reference to the drawings.

In the fourteenth embodiment, the physical dimension to be applied shown in FIG. 1 is assumed to be "Bit Cell Area" and the second usage mode shown in FIG. 19 is assumed to be "No Need to Retain Data during Standby"

Figure 21A:
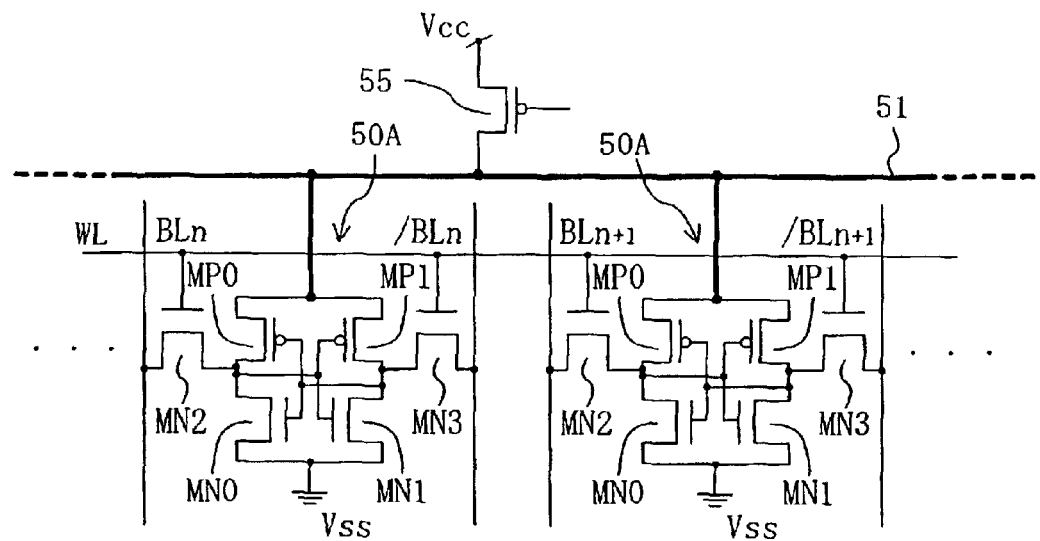
Figure 21B:
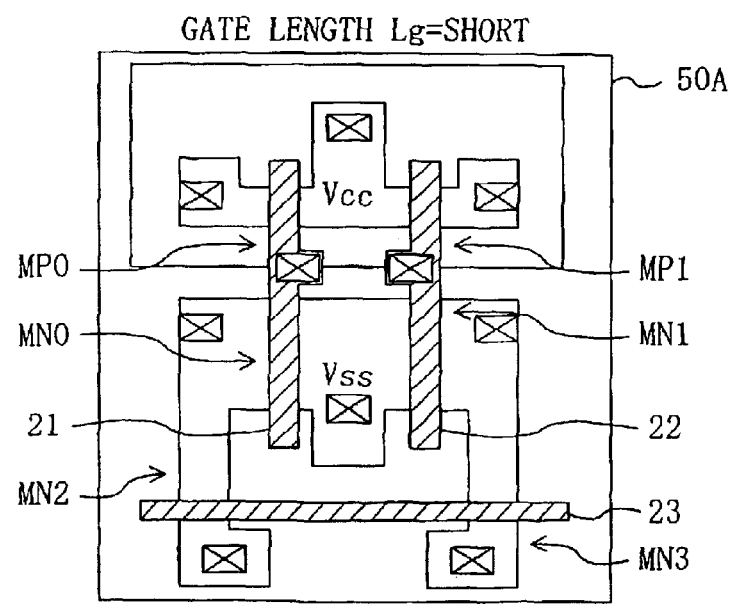

FIGS. 21A and 21B show an SRAM block formed in a semiconductor integrated circuit device, of which FIG. 21A shows a circuit structure of the SRAM block in which power shutdown control is performed and FIG. 21B shows a plan structure of bit cells contained in the SRAM block.

Figure 22A:
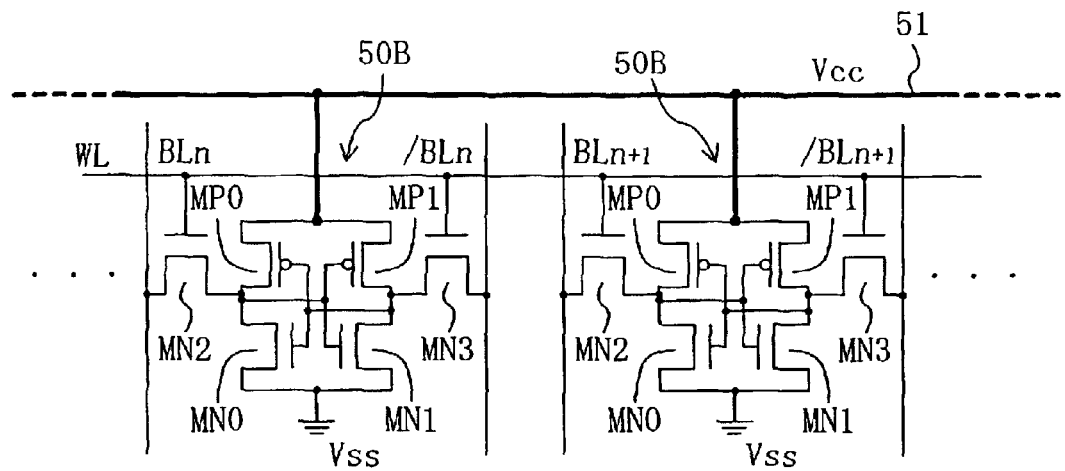
Figure 22B:
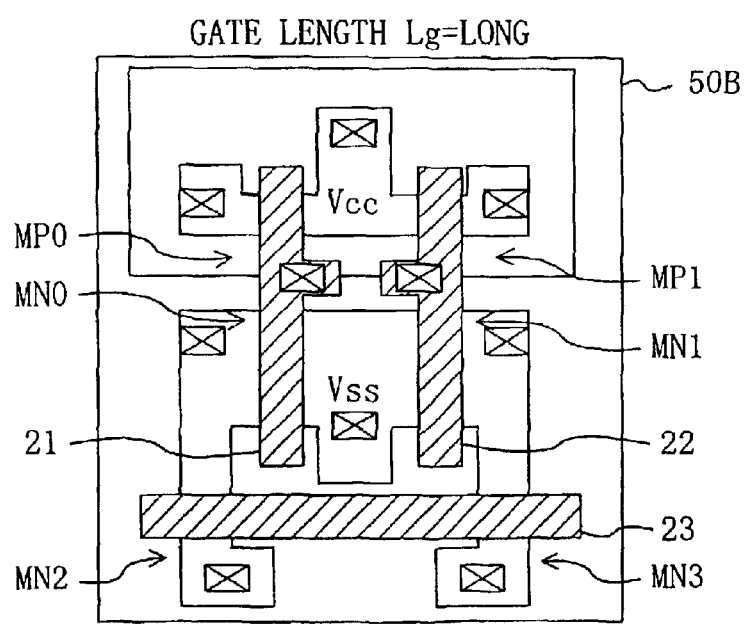

FIGS. 22A and 22B show an SRAM block formed in the semiconductor integrated circuit device, of which FIG. 22A shows a circuit structure of the SRAM block in which power shutdown control is not performed and FIG. 22B shows a plan structure of bit cells contained in the SRAM block.

It is to be noted that each of the bit cells 50A shown in FIG. 21A has the same structure as each of the bit cells 50 shown in FIG. 13A and the bit cell 50B shown in FIG. 21B has the same structure as the bit cell 50A shown in FIG. 11B. In the drawings, like parts are designated by like reference numerals.

Likewise, each of the bit cells 50B shown in FIG. 22A has the same structure as each of the bit cells 50B shown in FIG. 14A and the bit cell 50B shown in FIG. 22B has the same structure as the bit cell 50B shown in FIG. 12B. In the drawings, like parts are designated by like numerals.

To use a semiconductor integrated circuit device having a memory circuit for mobile applications, a leakage current in the memory circuit should be suppressed during standby. Therefore, a method which most positively suppresses the leakage current is to turn OFF the power supply during standby.

However, since a memory circuit required to retain data also exists, it has conventionally been impossible to turn OFF a power supply for a chip containing a memory circuit which retains data during standby. For a memory circuit formed on a chip, especially an SRAM circuit, a circuit having a long gate length Lg and a large bit cell has been used inevitably such that the problem of a leakage current does not occur.

If a power shutdown function performed by a switch 55 for power shutdown is incorporated in each of various SRAM circuits except for the SRAM circuit which retains data during standby, as in the SRAM block shown in FIG. 21A, there is no probability of the occurrence of a leakage current. Since bit cells 50A each having a small gate length Lg can be implemented in the SRAM block having the power shutdown function, as shown in FIG. 22B, the bit cell area can be reduced.

Thus, according to the fourteenth embodiment, the SRAM block which need not retain data and therefore contains the bit cells 50A each having a relatively small gate length Lg is disposed in a region of a chip where micro-patterning variations are large, as shown in FIG. 21A. On the other hand, the SRAM block which should retain data and therefore contains the bit cells 50B each having a relatively large gate length Lg is disposed in a region of the chip where micro-patterning variations are small, as shown in FIG. 22A. In either case, the area of the chip can be reduced. This is because a power shutdown function need not be incorporated in the SRAM block containing the bit cells 50B.

In the SRAM circuit which should retain data during standby, as shown in FIG. 14A, wires (nodes) at different potentials are formed preferably in different wiring layers to reduce the probability of a short circuit occurring between the wires at different potentials, as shown in FIG. 14B.

Even if the SRAM block having a power shutdown function and the SRAM block not having a power shutdown function are formed on one chip, the area occupied by each of the bit cells 50A can be reduced.

Although the fourteenth embodiment has described the SRAM blocks formed in the semiconductor integrated circuit device, the present invention is not limited to SRAM blocks.

What is claimed is:

1. A semiconductor integrated circuit device comprising:

a first memory block including a first SRAM bit cell, gates of transistors included in the first SRAM bit cell being arranged in a same direction, and a second memory block including a second SRAM bit cell, gates of transistors included in the second SRAM bit cell being arranged in different directions, wherein the area of the second SRAM bit cell is larger than the area of the first SRAM bit cell.

2. The semiconductor integrated circuit device of claim 1, wherein the direction of the transistors included in the first SRAM bit cell coincides with a direction having a priority in optimizing conditions for lithography and etching.

3. The semiconductor integrated circuit device of claim 2, wherein the second SRAM bit cell has an access transistor and a drive transistor, a gate of the access transistor being arranged in a direction which crosses a direction of a gate of the drive transistor.

4. The semiconductor integrated circuit device of claim 2, wherein the first SRAM bit cell comprises first, second, third and fourth gates oriented in a first direction, each of the first, second, third and fourth gates forming part of at least one transistor, and the second SRAM bit cell comprises access transistors and drive transistors, a gate of the access transistors being arranged in the first direction and gates of the drive transistors being arranged in a second direction which crosses the first direction.

* * * * *